(12) United States Patent
Imai et al.

(10) Patent No.: US 11,943,531 B2
(45) Date of Patent: Mar. 26, 2024

(54) ELECTRONIC APPARATUS CAPABLE OF COMMUNICATING WITH CONTENT PROCESSING SYSTEM, METHOD FOR CONTROLLING THE SAME, AND STORAGE MEDIUM

(71) Applicant: CANON KABUSHIKI KAISHA, Tokyo (JP)

(72) Inventors: Ryo Imai, Kanagawa (JP); Satoshi Masuda, Kanagawa (JP); Ryo Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 17/556,379

(22) Filed: Dec. 20, 2021

(65) Prior Publication Data
US 2022/0210319 A1    Jun. 30, 2022

(30) Foreign Application Priority Data
Dec. 28, 2020 (JP) .................................. 2020-218853

(51) Int. Cl.
*H04N 23/60* (2023.01)
*H04N 23/63* (2023.01)
*H04N 23/80* (2023.01)

(52) U.S. Cl.
CPC ........... *H04N 23/64* (2023.01); *H04N 23/633* (2023.01); *H04N 23/80* (2023.01); *H04N 23/631* (2023.01)

(58) Field of Classification Search
CPC ...... H04N 23/64; H04N 23/633; H04N 23/80; H04N 23/631; H04N 23/661; H04N 23/53;
(Continued)

(56) References Cited

U.S. PATENT DOCUMENTS

2004/0196502 A1\* 10/2004 Mikawa ............. H04N 1/00132
358/1.15
2005/0275729 A1\* 12/2005 Billerbeck ............ G06F 3/0481
348/222.1
(Continued)

FOREIGN PATENT DOCUMENTS

| JP | 2003274260 A | 9/2003 |
| JP | 2009199400 A | 9/2009 |
| JP | 2009252120 A | 10/2009 |

*Primary Examiner* — Christopher K Peterson
(74) *Attorney, Agent, or Firm* — Canon U.S.A., Inc. IP Division

(57) ABSTRACT

An electronic apparatus configured to communicate with a content processing system, the electronic apparatus includes a communication controller configured to control transmission of a processing instruction for content to the content processing system and control acquisition of a remaining content amount available for the processing from the content processing system via a communication unit, and a display controller configured to control display of a numerical value indicating the acquired remaining content amount in a specific display area, and in a case where a predetermined condition about communication is satisfied, control performing of a specific display related to the specific display area based on satisfaction of the predetermined condition, the specific display being different from the numerical value indicating the remaining content amount.

18 Claims, 17 Drawing Sheets

(58) Field of Classification Search
CPC ...... H04N 23/50; H04N 23/55; H04N 23/611; H04N 23/62; H04N 23/667
See application file for complete search history.

(56) References Cited

U.S. PATENT DOCUMENTS

2013/0195251 A1* 8/2013 Saigusa .................. A61B 6/586
378/101
2019/0356788 A1* 11/2019 Oh ..................... G06Q 30/0641

* cited by examiner

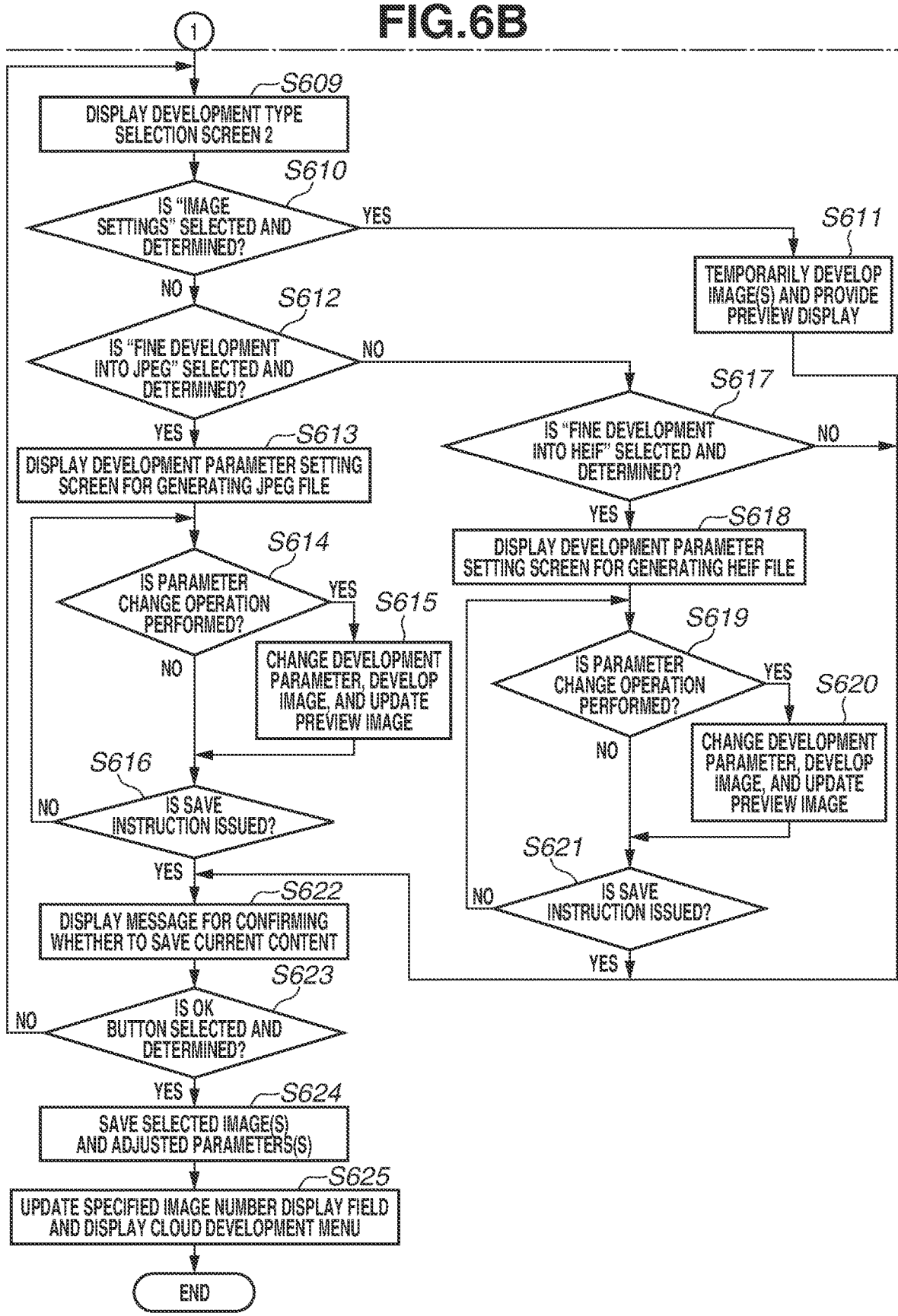

ELECTRONIC APPARATUS CAPABLE OF COMMUNICATING WITH CONTENT PROCESSING SYSTEM, METHOD FOR CONTROLLING THE SAME, AND STORAGE MEDIUM

BACKGROUND

Field of the Disclosure

The present disclosure relates to an electronic apparatus that can issue a content processing instruction to a content processing system, a method for controlling the same, and storage medium.

Description of the Related Art

Systems for transmitting an instruction to process contents from an electronic apparatus as a user terminal to a content processing system provided on a network have been known in recent years. As an example of such a system, a service for transmitting a raw image file from a user terminal to a server and requesting the server to perform development of the raw image file using sophisticated image processing provided on the cloud has been known. Such a content processing system using a server and the like on the cloud is offered at cost. In running such a service, it is necessary to put certain restrictions on the number of times that a user can use the service, for example, by applying limitations on the number of times that a user can use the service free of charge, and making available the service to a user on a chargeable basis based on a user's purchase price. Consequently, it becomes necessary to appropriately manage the remaining number of times of the service available for a user in the content processing system.

Japanese Patent Application Laid-Open No. 2009-199400 discusses a method in which, in a case where an apparatus fails to obtain a processing result from a server in response to a command transmitted from the apparatus, the apparatus obtains the processing result by using a next command inquiry to the server, to ensure appropriate processing even when a communication failure occurs between the apparatus and the server. Japanese Patent Application Laid-Open No. 2009-252120 discusses a method in which, a server transmits a processing instruction together with identification information to a client, and in a case where the server obtains a processing result of the processing instruction from the client, the server disables the identification information, to prevent redundant processing from being performed on the result even when a communication failure occurs between the server and the client.

However, in Japanese Patent Application Laid-Open No. 2009-199400 and Japanese Patent Application Laid-Open No. 2009-252120, sufficient discussion is not given in display for users in a time period before a processing result as a response to a transmitted processing instruction is obtained. In such a time period, whether the processing is normally performed is unknown for a sender of the processing instruction, and information about the remaining number of times of the service available for a user managed by the sender of the processing instruction and the remaining number of times of the service available for the user managed by a content processing system which has received the processing instruction can be inconsistent with each other. If the remaining number of times managed by the sender of the processing instruction is displayed in a state where there is an inconsistency in the remaining number of times between the sender and the content processing system, the user may be misled by the display of the remaining number of times which does not coincide with the remaining number of times managed by the content processing system.

SUMMARY

Embodiments of the present disclosure are directed to providing an electronic apparatus, a method for controlling the electronic apparatus, a program, and a recording medium that can perform display of information less likely to cause user's misunderstanding about the remaining times of contents processing available for a user in a content processing system.

According to embodiments of the present disclosure, an electronic apparatus configured to communicate with a content processing system, the electronic apparatus includes a communication controller configured to control transmission of a processing instruction for content to the content processing system and control acquisition of a remaining content amount available for the processing from the content processing system via a communication unit, and a display controller configured to control display of a numerical value indicating the acquired remaining content amount in a specific display area, and in a case where a predetermined condition about communication is satisfied, control performing of a specific display related to the specific display area based on satisfaction of the predetermined condition, the specific display being different from the numerical value indicating the remaining content amount.

Further features of the present disclosure will become apparent from the following description of exemplary embodiments with reference to the attached drawings.

BRIEF DESCRIPTION OF THE DRAWINGS

FIGS. 6A and 6B are a flowchart illustrating addition processing.

DESCRIPTION OF THE EMBODIMENTS

Exemplary embodiments of the present disclosure will be described below with reference to the drawings.

<External Views of Digital Camera 100>

Figure 1A:
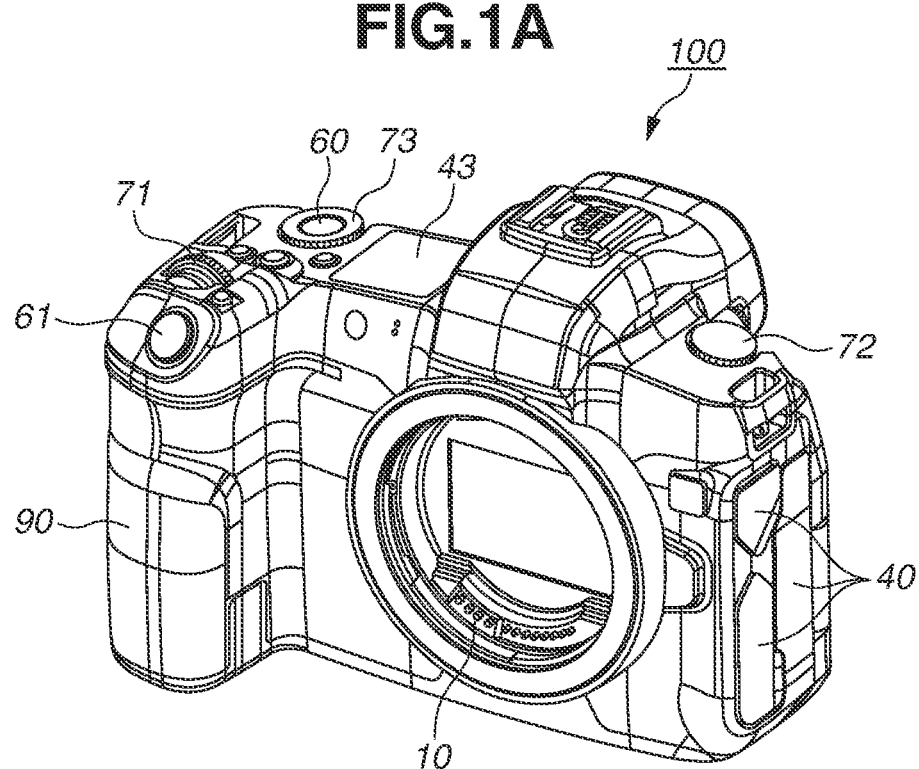
FIG. 1A is a diagram illustrating a front perspective view of a digital camera.
Figure 1B:
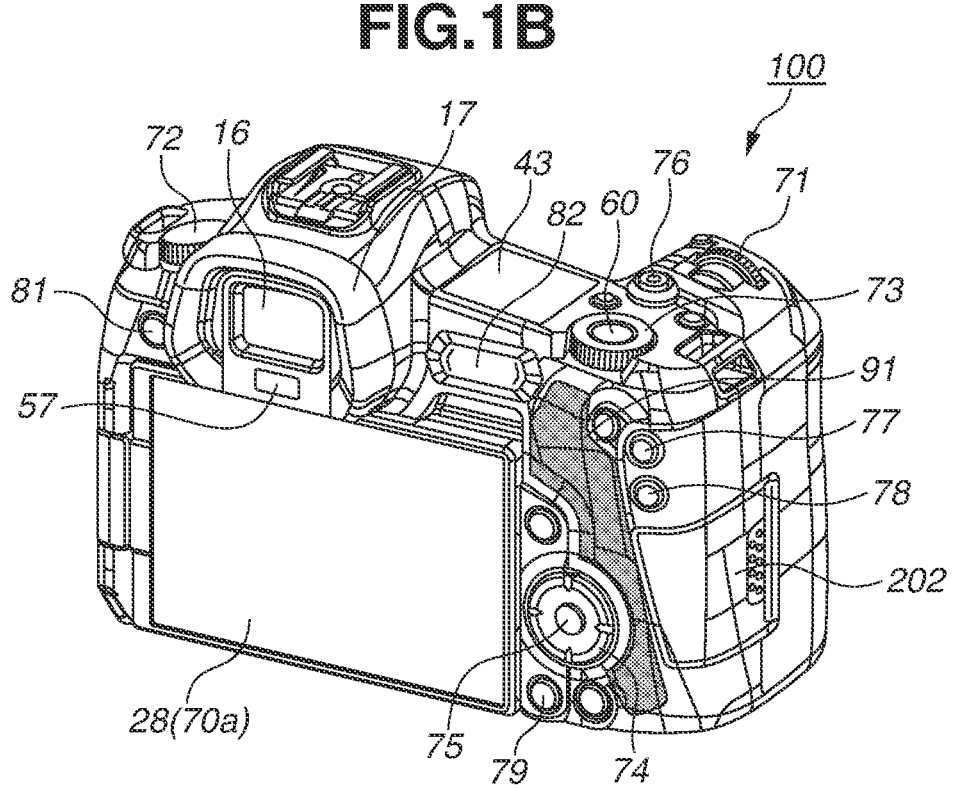
FIG. 1B is a diagram illustrating a rear perspective view of the digital camera.

FIGS. 1A and 1B are diagrams illustrating external views of a digital camera 100 (imaging apparatus) that is an example of an apparatus (electronic apparatus) to which an exemplary embodiment of the present disclosure can be applied. FIG. 1A is a front perspective view of the digital camera 100. FIG. 1B is a rear perspective view of the digital camera 100.

A display unit 28 is a display unit on the rear of the digital camera 100, and displays images and various types of information. A touch panel 70a can detect a touch operation performed on the display surface (touch operation surface) of the display unit 28. An external-viewfinder display unit 43 is a display unit on the top of the digital camera 100, and displays various setting values of the digital camera 100, including a shutter speed and an aperture. A shutter button 61 is an operation member for issuing an imaging instruction. A mode selection switch 60 is an operation member for switching between various modes.

Terminal covers 40 are covers for protecting connectors (not illustrated) for connection cables and the like that connect the digital camera 100 to external devices.

A main electronic dial 71 is a rotary operation member. Setting values, such as the shutter speed and the aperture, can be changed by rotating the main electronic dial 71. A power switch 72 is an operation member for switching the power of the digital camera 100 on and off. A sub electronic dial 73 is a rotary operation member. A selection frame (cursor) can be moved and images can be fast-forwarded by rotating the sub electronic dial 73. A four-way directional pad 74 is configured in such a way that top, bottom, left, and right portions can be separately pressed, and the digital camera 100 can perform processing corresponding to a pressed portion of the four-way directional pad 74. A set button 75 is a push button and mainly used to determine a selection item.

A moving image button 76 is used to issue instructions to start and stop moving image capturing (recording). An automatic exposure (AE) lock button 77 is a push button. An exposure state can be fixed by pressing the AE lock button 77 in an imaging standby state. A zoom button 78 is an operation button for switching on and off a zoom mode during a live view (LV) display in an imaging mode. An LV image can be zoomed in and out by operating the main electronic dial 71 with the zoom mode on. In a playback mode, the zoom button 78 functions as an operation button for magnifying a playback image or increasing the magnification ratio. A playback button 79 is an operation button for switching between an imaging mode and the playback mode. In a case where the playback button 79 is pressed during the imaging mode, the imaging mode transitions to the playback mode, where the latest image among images recorded on a recording medium 200 (to be described below) can be displayed on the display unit 28. A menu button 81 is a push button to be used for an instruction operation to display a menu screen. In a case where the menu button 81 is pressed, a menu screen on which various settings can be performed is displayed on the display unit 28.

The user can intuitively perform various settings by using the menu screen displayed on the display unit 28, the four-way directional pad 74, and the set button 75.

A touch bar 82 (multifunction bar, or M-Fn bar) is a line-shaped touch operation member (touch line sensor) capable of receiving a touch operation. The touch bar 82 is disposed at a position where a touch operation can be performed (the touch bar 82 can be touched) with a right thumb while a grip portion 90 is gripped with the right hand (gripped with the right little finger, ring finger, and middle finger) in such a manner that the shutter button 61 can be pressed with the right index finger. In other words, the touch bar 82 is disposed at a position where the user in a state of putting an eye on an eyepiece unit 16 and looking through a viewfinder to be ready for pressing the shutter button 61 anytime (in an imaging attitude) can operate the touch bar 82. The touch bar 82 is a receiving unit capable of receiving a tap operation (operation of a touch and releasing the touch within a predetermined period without a move) and left and right slide operations (operations of a touch and then moving the touch position without releasing the touch) on the touch bar 82. The touch bar 82 is an operation member different from the touch panel 70a and does not have a display function.

A communication terminal 10 is a communication terminal for the digital camera 100 to communicate with a lens unit 150 (to be described below) which is a detachable unit. The eyepiece unit 16 is an eyepiece unit of an eyepiece viewfinder 17 (look-through viewfinder). The user can visually observe a video image displayed on an electronic viewfinder (EVF) 29 inside the eyepiece viewfinder 17 via the eyepiece unit 16. An eye proximity detection unit 57 is an eye approach detection sensor that detects whether the user (photographer) is putting an eye on the eyepiece unit 16. A lid 202 is a lid for a slot accommodating the recording medium 200 (to be described below). The grip portion 90 is a holding portion having a shape easy to be gripped with a right hand when a user holds the digital camera 100 in position. The shutter button 61 and the main electronic dial 71 are disposed at positions where the shutter button 61 and the main electronic dial 71 can be operated with the right index finger while the digital camera 100 is held with the grip portion 90 gripped with the right little finger, ring finger, and middle finger. The sub electronic dial 73 and the touch bar 82 are disposed at positions where the sub electronic dial 73 and the touch bar 82 can be operated with the right thumb in the same state. A thumb rest portion 91 (thumb standby position) is a grip member at a position on the rear of the digital camera 100 where the user can easily rest the thumb of the right hand gripping the grip portion 90 when not operating any of the operation members. The thumb rest portion 91 is made of a rubber member for an improved hold (gripping feel).

<Configuration Block Diagram of Digital Camera 100>

Figure 2:
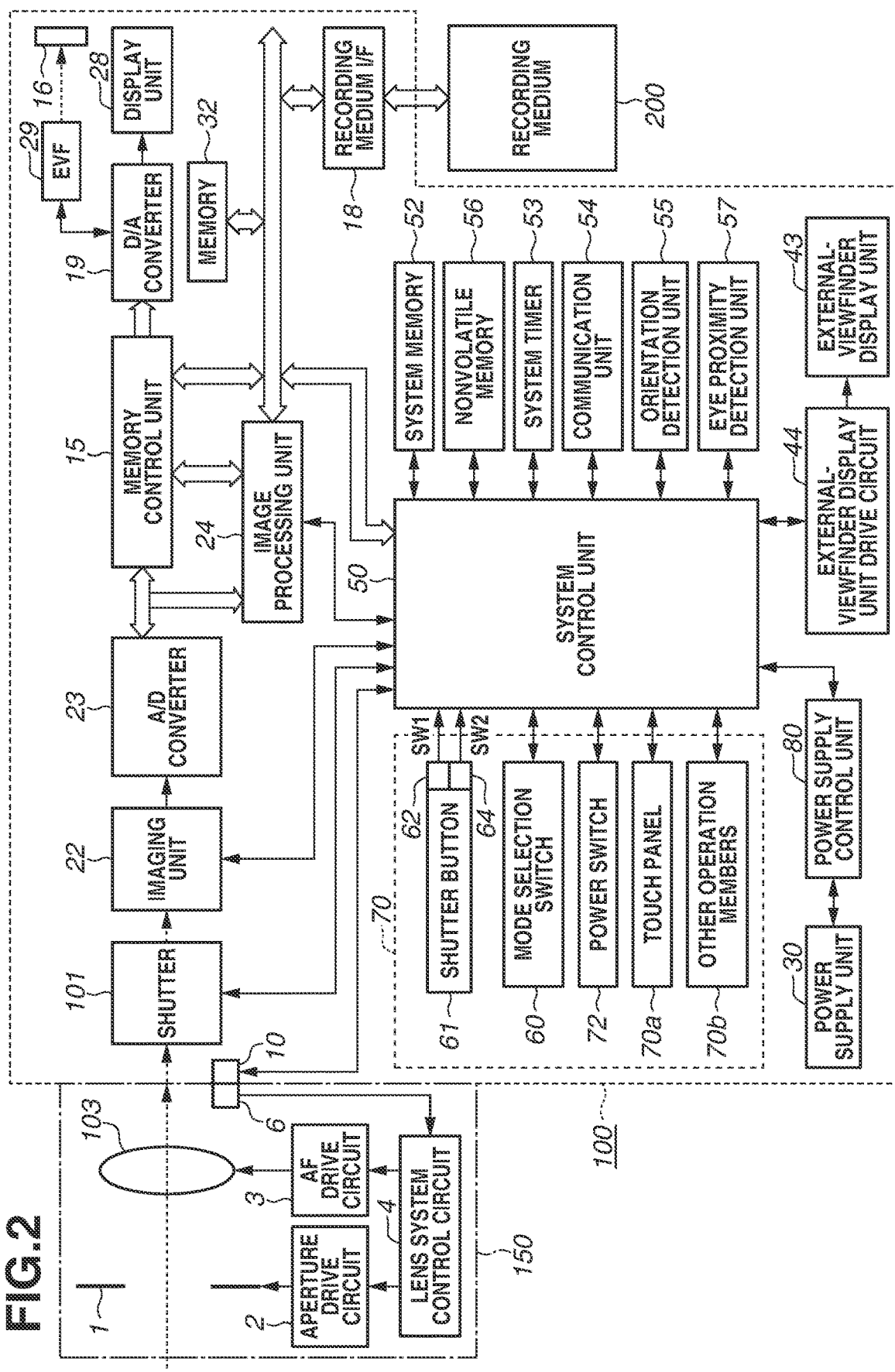
FIG. 2 is a schematic block diagram illustrating a hardware configuration example of the digital camera.

FIG. 2 is a block diagram illustrating a configuration example of the digital camera 100. A lens unit 150 is a lens unit including an interchangeable imaging lens. A lens 103 typically includes a plurality of lenses, but is represented by a single lens in FIG. 2 for the sake of simplicity. A communication terminal 6 is a communication terminal for the lens unit 150 to communicate with the digital camera 100. The communication terminal 10 is a communication terminal for the digital camera 100 to communicate with the lens unit 150. The lens unit 150 communicates with a system control unit 50 via the communication terminals 6 and 10. The lens unit 150 controls an aperture stop 1 via an aperture drive circuit 2 by using a lens system control circuit 4 inside the lens unit 150. The lens system control circuit 4 adjusts the focus of the lens unit 150 by moving a position of the lens 103 via an automatic focus (AF) drive circuit 3.

A shutter 101 is a focal plane shutter that can freely control an exposure time of an imaging unit 22 based on control by the system control unit 50.

The imaging unit 22 is an image sensor including a charge-coupled device (CCD) sensor or complementary metal-oxide-semiconductor (CMOS) sensor that converts an optical image into an electrical signal. The imaging unit 22 may include an imaging plane phase difference sensor that outputs defocus amount information to the system control unit 50. An analog-to-digital (A/D) converter 23 converts an analog signal output from the imaging unit 22 into a digital signal.

An image processing unit 24 performs predetermined processing (such as pixel interpolation, reduction and other resize processing, and color conversion processing) on data from the A/D converter 23 or data from a memory control unit 15. The image processing unit 24 performs predetermined calculation processing using captured image data. The system control unit 50 performs exposure control and distance measurement control based on the calculation result obtained by the image processing unit 24. Accordingly, through-the-lens (TTL) AF processing, AE processing, electronic flash (EF) (preliminary flash emission) processing are performed. The image processing unit 24 further performs predetermined calculation processing using the captured image data, and performs TTL automatic white balance (AWB) processing based on the calculation result obtained.

The data output from the A/D converter 23 is written to a memory 32 via the image processing unit 24 and the memory control unit 15. Alternatively, the data output from the A/D converter 23 is written to the memory 32 not via the image processing unit 24 but via the memory control unit 15. The memory 32 stores image data that has been obtained by the imaging unit 22 and then digitally converted by the A/D converter 23, and image data to be displayed on the display unit 28 and the EVF 29. The memory 32 has a storage capacity sufficient to store a predetermined number of still images or a predetermined duration of moving image and sound.

The memory 32 also serves as an image display memory (video memory). A digital-to-analog (D/A) converter 19 converts image display data stored in the memory 32 into an analog signal, and supplies the analog signal to the display unit 28 and the EVF 29. The display image data written to the memory 32 is thus displayed on the display unit 28 and the EVF 29 via the D/A converter 19. Each of the display unit 28 and the EVF 29 is a display, such as a liquid crystal display (LCD) and an organic electroluminescence (EL) display, and provides a display based on the analog signal from the D/A converter 19. An LV display can be provided by converting a digital signal A/D-converted by the A/D converter 23 and stored in the memory 32 into an analog signal by the D/A converter 19, and successively transferring the analog signal to the display unit 28 or the EVF 29 and displaying the analog signal. The image displayed by the LV display will hereinafter be referred to as an LV image.

The system control unit 50 is a control unit including at least one processor and/or at least one circuit, and controls the entire digital camera 100. The system control unit 50 is a processor as well as a circuit. The system control unit 50 implements various types of processing according to the present exemplary embodiment to be described below by executing programs recorded in a nonvolatile memory 56. The system control unit 50 also performs display control by controlling the memory 32, the D/A converter 19, the display unit 28, and the EVF 29.

A system memory 52 is a random access memory (RAM), for example. The system control unit 50 loads operating constants of the system control unit 50, variables, and programs read from the nonvolatile memory 56 into the system memory 52.

The nonvolatile memory 56 is an electrically erasable and recordable memory. Examples include an electrically erasable programmable read-only memory (EEPROM). The nonvolatile memory 56 records operating constants of the system control unit 50 and programs. The programs here refer to ones for performing various flowcharts to be described below in the present exemplary embodiment.

A system timer 53 is a clocking unit that measures time to be used for various types of control and the time of a built-in clock.

A communication unit 54 includes a communication interface, and transmits and receives video signals and audio signals to and from an external device connected wirelessly or by a cable. The communication unit 54 can also connect to a wireless local area network (LAN) and the Internet. The communication unit 54 can also communicate with an external device using Bluetooth® and Bluetooth® Low Energy. The communication unit 54 can transmit images captured by the imaging unit 22 (including an LV image) and images recorded on the recording medium 200, and receive image data and other various types of information from an external device.

An orientation detection unit 55 detects orientation of the digital camera 100 with respect to the direction of gravity. Whether an image captured by the imaging unit 22 is one captured with the digital camera 100 held landscape or with the digital camera 100 held portrait can be determined based on orientation detected by the orientation detection unit 55. The system control unit 50 can add direction information corresponding to the orientation detected by the orientation detection unit 55 to the image file of the image captured by the imaging unit 22, or rotate the image and record the rotated image. An acceleration sensor or a gyro sensor can be used as the orientation detection unit 55. Motion of the digital camera 100, including pan, tilt, lift, and whether at rest or not, can also be detected by using the acceleration sensor or gyro sensor that is the orientation detection unit 55.

The eye proximity detection unit 57 is an eye proximity detection sensor that detects an approach (eye approach) and a separation (eye separation) of an eye (object) to/from the eyepiece unit 16 of the eyepiece viewfinder (hereinafter, referred to simply as a "viewfinder") 17 (proximity detection). The system control unit 50 switches the display unit 28 and the EVF 29 between display (display state) and non-display (hidden state) based on a state detected by the eye proximity detection unit 57. More specifically, in a case where the digital camera 100 is at least in an imaging standby state, and a display destination switching setting is set at automatic switching, the system control unit 50 turns on display on the display unit 28 as the display destination and turns off display on the EVF 29 during eye separation. The system control unit 50 turns on display on the EVF 29 as the display destination and turns off display on the display unit 28 during eye approach. Examples of the eye proximity detection unit 57 include an infrared proximity sensor. The eye proximity detection unit 57 can detect an approach of an object to the eyepiece unit 16 of the eyepiece viewfinder 17 including the built-in EVF 29. In a case where an object is in the proximity of the eye proximity detection unit 57, infrared rays projected from a light projection part (not illustrated) of the eye proximity detection unit 57 are reflected on the object and the reflected light is received by a light receiving part (not illustrated) of the eye proximity detection unit 57. How close an object is to the eyepiece unit 16 (eye approach distance) can also be determined based on the amount of infrared rays received. In such a manner, the eye proximity detection unit 57 performs eye approach detection to detect the approaching distance of the object to the eyepiece unit 16. In a case where an object approaching the eyepiece unit 16 from an eye separation state (non-approach state) into within a predetermined distance is detected, an eye approach is detected. In a case where an object having been detected in an eye approach state (approach state) is separated from the eye proximity detection unit 57 by a predetermined distance or more, an eye separation is detected. A threshold for detecting an eye approach and a threshold for detecting an eye separation may have hysteresis to be different from each other. After an eye approach is detected, the eye approach state continues until an eye separation is detected. After an eye separation is detected, the eye separation state continues until an eye approach is detected. The infrared proximity sensor is just an example, and other sensors capable of detecting a state that can be regarded as an eye approach may be employed for the eye proximity detection unit 57.

The external-viewfinder display unit 43 displays various setting values of the digital camera 100, including a shutter speed and an aperture, via an external-viewfinder display unit drive circuit 44.

A power supply control unit 80 includes a battery detection circuit, a direct-current-to-direct-current (DC-DC) converter, and a switch circuit for switching blocks to be energized. The power supply control unit 80 detects presence or absence of a battery mounted, a type of battery, and a remaining battery level. The power supply control unit 80 also controls the DC-DC converter based on the detection results and instructions from the system control unit 50, and supplies predetermined voltages to various units, including the recording medium 200, for predetermined periods. A power supply unit 30 includes a primary battery, such as an alkali battery and a lithium battery, a secondary battery, such as a nickel-cadmium (NiCd) battery, a nickel metal hydride (NiMH) battery, and a lithium-ion (Li) battery, and/or an alternating current (AC) adaptor.

A recording medium interface (I/F) 18 is an I/F with which to connect to the recording medium 200, such as a memory card and a hard disk. The recording medium 200 is one intended to record captured images, and includes a semiconductor memory or a magnetic disk.

An operation unit 70 is an input unit for receiving operations from a user (user operations). The operation unit 70 is used by a user to input various operation instructions to the system control unit 50. As illustrated in FIG. 2, the operation unit 70 includes the shutter button 61, the mode selection switch 60, the power switch 72, the touch panel 70a, and other operation members 70b. The other operation members 70b include the main electronic dial 71, the sub electronic dial 73, the four-way directional pad 74, the set button 75, the moving image button 76, the AE lock button 77, the zoom button 78, the playback button 79, the menu button 81, and the touch bar 82.

The shutter button 61 includes a first shutter switch 62 and a second shutter switch 64. The first shutter switch 62 turns on to generate a first shutter switch signal SW1 when the shutter button 61 is operated halfway, i.e., half-pressed (imaging preparation instruction). The system control unit 50 starts imaging preparation operations, such as the AF processing, the AE processing, the AWB processing, and the EF (preliminary flash emission) processing, in response to the first shutter switch signal SW1.

The second shutter switch 64 turns on to generate a second shutter switch signal SW2 when the shutter button 61 is completely operated, i.e., fully pressed (imaging instruction). In response to the second shutter switch signal SW2, the system control unit 50 starts a series of image processing operations from reading signals from the imaging unit 22 to writing a captured image to the recording medium 200 as an image file.

The mode selection switch 60 switches an operation mode of the system control unit 50 to any one of a still image capturing mode, a moving image capturing mode, and a playback mode. The still image capturing mode includes such modes as an automatic imaging mode, an automatic scene determination mode, a manual mode, an aperture priority mode (Av mode), a shutter speed priority mode (Tv mode), and a program AE mode (P mode). The still image capturing mode further includes various scene modes each of which is for an imaging scene-specific imaging setting, and a custom mode. The user can directly switch to one of the modes by using the mode selection switch 60. Alternatively, the user can once switch to an imaging mode list screen by using the mode selection switch 60, and then selects and switches to one of a plurality of displayed modes by using other operation members. The operation modes may similarly include a plurality of moving image capturing modes.

The touch panel 70a is a touch sensor for detecting various touch operations performed on the display surface of the display unit 28 (operation surface of the touch panel 70a). The touch panel 70a and the display unit 28 may be integrally configured. For example, the touch panel 70a is configured to have a light transparency not interfering with display on the display unit 28, and attached onto a display surface of the display unit 28. Input coordinates of the touch panel 70a are associated with display coordinates on the display surface of the display unit 28. A graphical user interface (GUI) that enables the user to perform operations as if directly operating a screen displayed on the display unit 28 can thus be provided.

The system control unit 50 can detect the following operations or states of the touch panel 70a:

That a finger or a pen not touching the touch panel 70a newly touches the touch panel 70a, i.e., a start of a touch (hereinafter, referred to as a touch-down);

A state where the touch panel 70a is touched with a finger or a pen (hereinafter, referred to as a touch-on);

That a finger or a pen touching the touch panel 70a moves (hereinafter, referred to as a touch-move);

That a finger or a pen touching the touch panel 70a is released from the touch panel 70a, i.e., an end of a touch (hereinafter, referred to as a touch-up); and A state where nothing is touching the touch panel 70a (hereinafter referred to as a touch-off).

In a case where a touch-down is detected, a touch-on is also detected at the same time. After a touch-down, a touch-on typically continues to be detected unless a touch-up is detected. In a case where a touch-move is detected, a touch-on is also detected at the same time. In a case where a touch-on is detected and the touch position does not move, a touch-move is not detected. A touch-off is detected after all fingers and pens touching are detected to be touched up.

The system control unit 50 is notified of such operations and states and position coordinates of a touching finger or a touching pen on the touch panel 70a via an internal bus. The system control unit 50 then determines what operation (touch operation) is performed on the touch panel 70a based on the notified information. In a case where a touch-move is performed, the system control unit 50 can also determine a moving direction of the finger or pen moving over the touch panel 70a in terms of vertical and horizontal components on the touch panel 70a separately based on a change in position coordinates. In a case where a touch-move is detected for a predetermined distance or more, the system control unit 50 determines that a slide operation is performed. An operation of quickly moving a finger touching the touch panel 70a for some distance and releasing the finger immediately after the moving is called a flick. In other words, a flick is an operation of quickly sweeping the surface of the touch panel 70a with a finger or a pen as if flicking.

In a case where a touch-move is detected for a predetermined distance or more at a predetermined speed or higher and a touch-up is detected immediately after the touch-move, the system control unit 50 can determines that a flick is performed (a flick is performed after a slide operation). A touch operation of simultaneously touching (multi-touching) a plurality of points (for example, two points) and bringing the touch positions close to each other is called a pinch-in. A touch operation of separating the touch positions from each other is called a pinch-out. A pinch-out and a pinch-in are referred to collectively as pinch operations (or simply pinches). The touch panel 70a may be any one of various types of touch panels, including resistive, capacitive, elastic wave, infrared, electromagnetic induction, image recognition, and optical-sensor touch panels. Possible detection methods include one for detecting a touch based on contact with the touch panel and one for detecting a touch based on approach of a finger or pen to the touch panel, either of which may be employed.

Figure 3:
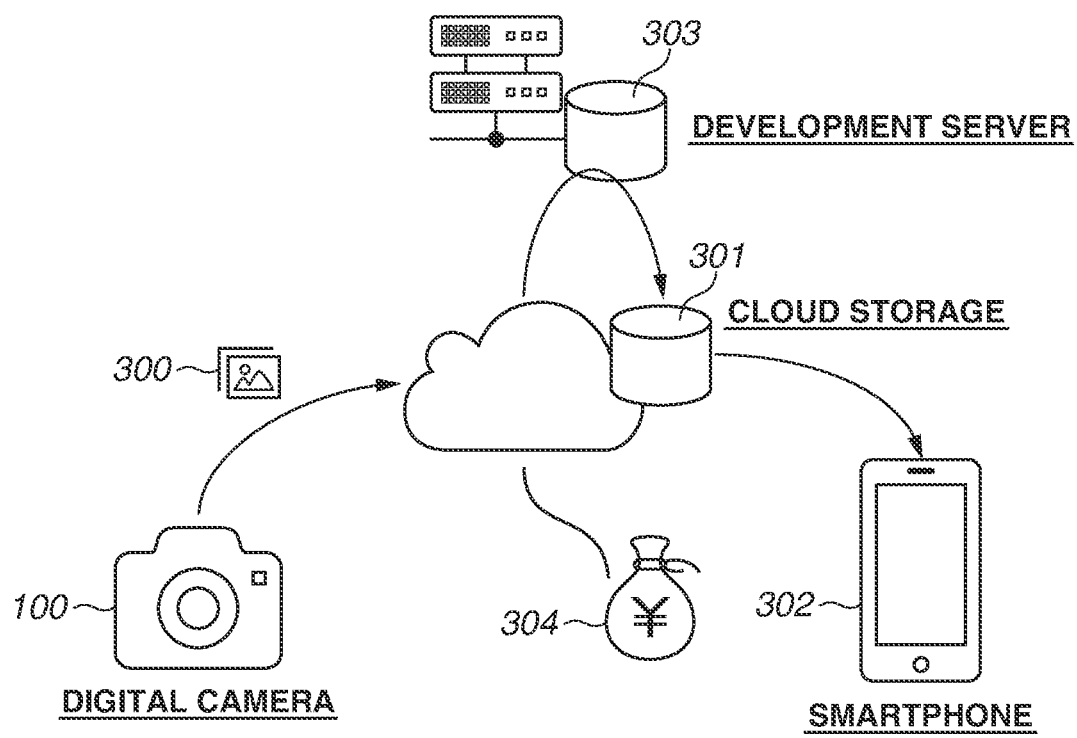
FIG. 3 is a conceptual diagram illustrating an image processing system including the digital camera.

FIG. 3 is a conceptual diagram illustrating an image processing system including the digital camera 100. FIG. 3 illustrates a relationship between the digital camera 100 and peripheral devices, such as a cloud server.

A cloud storage 301 is a storage server on the cloud for storing images. The digital camera 100 and the cloud storage 301 are linked (paired) with each other in advance, whereby captured images 300 can be transmitted to the cloud storage 301 based on a transmission instruction issued from the digital camera 100. The link between the digital camera 100 and the cloud storage 301 has been established by using information (user account information) with which the user can be identified, such as a user identifier (ID).

A smartphone 302 is a mobile device (such as a mobile phone terminal and a tablet terminal) for browsing images. In the present exemplary embodiment, the smartphone 302 is a smartphone. The images stored in the cloud storage 301 can be browsed using the smartphone 302.

A development server 303 is an image processing server (content processing server) that performs image processing, such as raw development, and is provided on the cloud. The development server 303 receives a development instruction from the smartphone 302 and performs development processing on images (contents) stored in the cloud storage 301. The development server 303 on the cloud has high throughput compared to personal computers (PCs), and are capable of performing more sophisticated types of image processing than development applications on PCs. The latest types of image processing can be performed by using the development server 303 even in a case where a terminal, such as the smartphone 302, is not updated with programs for performing latest sophisticated image processing. Specifically, in a case where a development instruction is issued, the cloud storage 301 transmits raw images stored therein to the development server 303, and the development server 303 performs development processing, such as sophisticated noise reduction using deep learning. The digital camera 100 is unable to perform such sophisticated types of development processing (image processing). After the development processing, the development server 303 transmits Joint Photographic Experts Group (JPEG) (or High Efficiency Image File (HEIF)) images that are finished developed images to the cloud storage 301. The development processing performed using the development server 303 will hereinafter be referred to as cloud development processing.

In the present exemplary embodiment, a method for browsing images using the smartphone 302 will be described as a method for checking a result obtained by the sophisticated development processing.

After the digital camera 100, the cloud storage 301, and the development server 303 are linked (associated) with each other using identification information, such as a user ID, development instructions can be issued from the digital camera 100 to the development server 303. Specifically, the user adjusts development processing parameters, i.e., image processing parameters, about color tones, such as white balance and brightness, of a raw image stored in the digital camera 100. The adjusted development processing parameters are recorded in the raw image file. The digital camera 100 then transmits the raw image file to the cloud storage 301 along with an instruction for the cloud development processing. The raw image file is transferred to the development server 303 via the cloud storage 301. The development server 303 performs the development processing based on the development processing parameters (image processing parameters) adjusted by the digital camera 100, and further performs the foregoing sophisticated image processing at the same time.

Next, the cloud development processing and a UI of the digital camera 100 for issuing a development instruction to the development server 303 will be described in detail. Before the detailed description, a supplementary description of the development server 303 will be given, including two preconditions in the present exemplary embodiment:

Precondition (1): The development server 303 is a dedicated server on the cloud, and incurs server maintenance costs and server communication costs.

Precondition (2): A plurality of servers is run in parallel as the development server 303.

There are two reasons why precondition (2) is applied to the development server 303 according to the present exemplary embodiment. First, the plurality of servers can perform parallel processing for development, whereby the processing is accelerated. Suppose, for example, that the development processing of a raw image is performed by four servers. In such a case, since the raw image can be divided into four areas and the four servers can perform the development processing at the same time, the processing speed can be approximately one quarter compared to the case where the development processing is performed by a single server. Even in a case where development instructions are simultaneously issued by four users, the development instructions from the users can be distributed to and processed by the respective servers. This reduces processing wait time compared to the case with a single server. Secondly, the load per server is reduced. For example, if one of the four servers fails and becomes unusable, the other three can continue processing, and the service does not need to be stopped.

Even in the environment where a plurality of servers is used to perform parallel processing, it is desirable to take into account the possibility of several thousands of users simultaneously issuing development instructions. The server maintenance costs and communication costs discussed in precondition (1) also taken into account, and thus the service provider may therefore desirably impose restrictions (upper limit) on the use per user. For example, restrictions can be imposed in such a manner that the number of images developable per user per month is limited up to M (M is a numeral). For the above-described purpose, accounts are created to manage the use of the development server 303 so that the development server 303 can be used only by users subscribed to a cloud development processing service, such as image processing service, content processing service. In the present exemplary embodiment, a user setting management unit 304 performs user management. The user setting management unit 304 may be implemented by the cloud storage 301 or by a management server different from the cloud storage 301.

With the foregoing user management, the cloud service including cloud development processing can be provided either on a free basis or on a paid basis. On a free basis, the cloud service is provided to a user on condition that the development server 303 can be used up to M images per month, by simply creating a user account (hereinafter, referred to simply as an account). On a paid basis, the cloud service is provided to a user on condition that the development server 303 can be used up to M images per month for fees like a subscription service. Information about the upper limit of use can be inquired and obtained by the digital camera 100 or other external devices linked with the cloud storage 301. The digital camera 100 may include a UI for creating an account and registering for subscription. Other devices such as the smartphone 302 may include the UI.

Based on the above described case, the cloud development processing and the UI of the digital camera 100 for issuing a development instruction to the development server 303 will be described in detail.

FIGS. 4 to 8A and 8B are flowcharts illustrating processing where the digital camera 100 (hereinafter, the digital camera 100 may be referred to simply as a camera) issues instructions for the cloud development processing. The flowcharts of FIGS. 4 to 8A and 8B are all implemented by loading programs recorded in the nonvolatile memory 56 into the system memory 52 and executing the programs by the system control unit 50. The system control unit 50 performs communication control using the communication unit 54 and display control on the display unit 28 by executing the programs. FIGS. 9A to 9F to 12A to 12C illustrate display examples of screens on the camera 100. FIG. 13 is a structure diagram of a raw image file. The following description will be given with reference to these diagrams.

Figure 4:
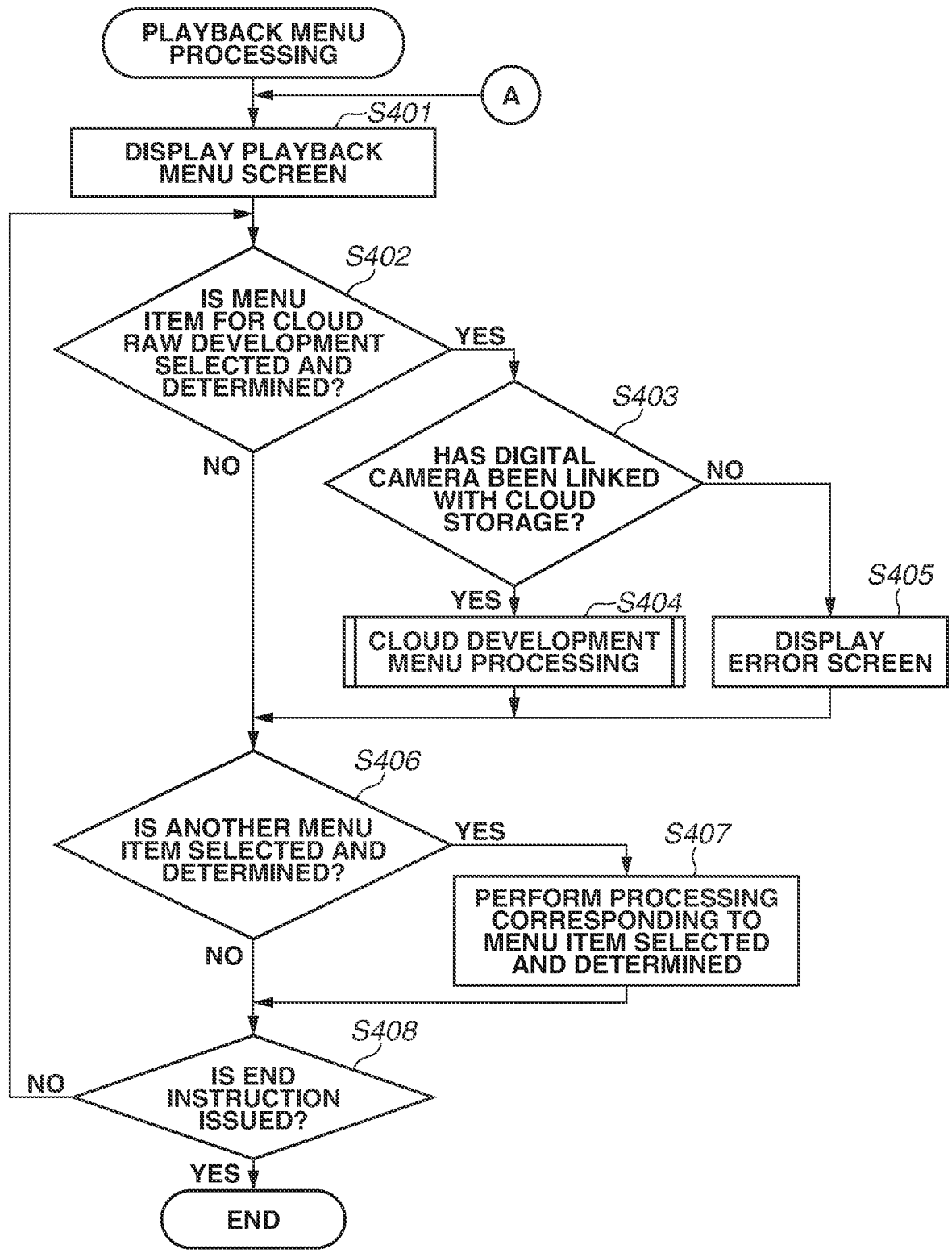
FIG. 4 is a flowchart illustrating playback menu processing.

FIG. 4 illustrates a procedure related to playback menu processing that is performed by the camera 100. The processing illustrated in FIG. 4 is started when the digital camera 100 is activated and set to the playback mode and the menu button 81 is pressed in a state where a playback image is displayed (in a state where a playback screen is displayed).

Figure 9A:
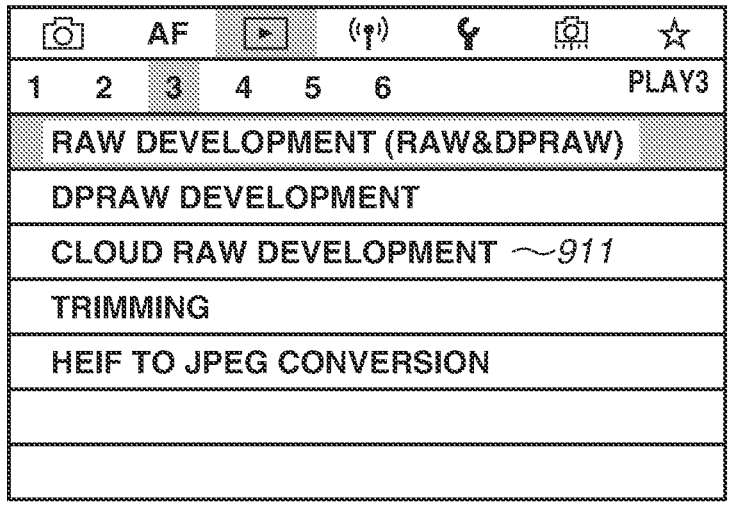
FIG. 9A is a diagram illustrating a display example of a playback menu screen.

In step S401, the system control unit 50 displays a playback menu screen on the display unit 28 of the digital camera 100. FIG. 9A illustrates a display example of the playback menu screen. The playback menu screen displays a plurality of menu items. For example, the menu items including "trimming", "raw development" for issuing an instruction for development in the camera main body, "HEIF to JPEG conversion", and "cloud raw development" are displayed. The user can select any one of the plurality of displayed menu items by moving a cursor to the menu item using the operation unit 70. The user can determine selection of (hereinafter, referred to as select and determine) a menu item selected by the cursor by pressing the set button 75.

In step S402, the system control unit 50 determines whether a menu item 911 for cloud raw development is selected and determined from among the menu items displayed on the playback menu screen.

In a case where the menu item 911 for cloud raw development is selected and determined (YES in step S402), the processing proceeds to step S403. In a case where the menu item 911 for cloud raw development is not selected or determined (NO in step S402), the processing proceeds to step S406.

In step S403, the system control unit 50 determines whether the digital camera 100 has been linked or paired with the cloud storage 301. In a case where the digital camera 100 has been linked with the cloud storage 301 (YES in step S403), the processing proceeds to step S404. In a case where the digital camera 100 has not been linked with the cloud storage 301 (NO in step S403), the processing proceeds to step S405. The link with the cloud storage 301 can be established in advance by using a pairing setting item included in a setting menu screen of the digital camera 100. In pairing setting, individual identification information about the digital camera 100 and account information are associated with each other to establish pairing by connecting to the cloud storage 301, entering the account information from the digital camera 100, and logging in to the cloud storage 301. In a case where the pairing established, the individual identification information about the digital camera 100 is associated with the account information and recorded in the cloud storage 301 or the user setting management unit 304. In response to the pairing established, the account information and information indicating the establishment of the pairing are also recorded in the nonvolatile memory 56 of the digital camera 100. In step S403, the system control unit 50 refers to the nonvolatile memory 56, and in a case where information indicating the establishment of the pairing is recorded, the system control unit 50 determines that the digital camera 100 has been linked (paired). In a case where information indicating the establishment of the pairing is not recorded, the system control unit 50 determines that the digital camera 100 has not been linked. In other words, the determination of step S403 can be performed on the offline device without connecting to the cloud storage 301.

In step S404, the system control unit 50 performs cloud development menu processing. The cloud development menu processing will be described below with reference to FIGS. 5A and 5B.

In step S405, the system control unit 50 displays an error screen on the display unit 28. Examples of a content of the error screen displayed here include "Not linked" and "Please pair your camera with the server".

In step S406, the system control unit 50 determines whether a menu item other than the menu item 911 for the cloud raw development (another menu item) is selected and determined from among the plurality of menu items displayed on the playback menu screen. In a case where a menu item other than the menu item 911 for the cloud raw development (another menu item) is selected and determined (YES in step S406), the processing proceeds to step S407. In a case where a menu item is not selected or determined (NO in step S406), the processing proceeds to step S408.

In step S407, the system control unit 50 performs processing corresponding to the menu item selected and determined in step S406. For example, in a case where the menu item for trimming is selected and determined, the system control unit 50 displays a screen for trimming an image.

In step S408, the system control unit 50 determines whether an instruction to end the playback menu screen is issued. In a case where the end instruction is issued (YES in step S408), the playback menu processing ends. The system control unit 50 switches the playback menu screen to an image playback screen in the playback mode. In case where the end instruction is not issued (NO in step S408), the processing returns to step S402.

Figure 5A:
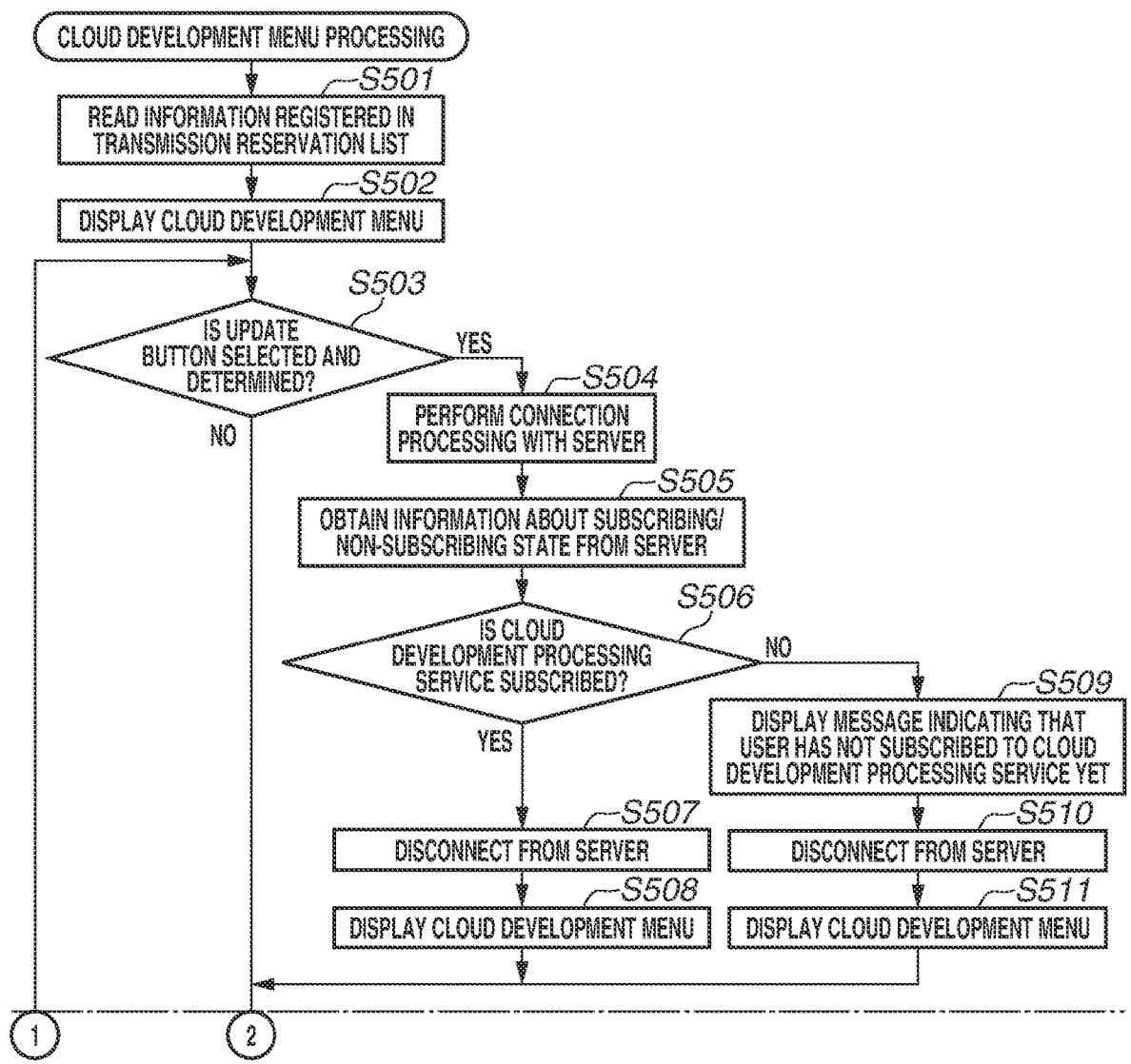
FIGS. 5A and 5B are a flowchart illustrating cloud development menu processing.
Figure 5B:
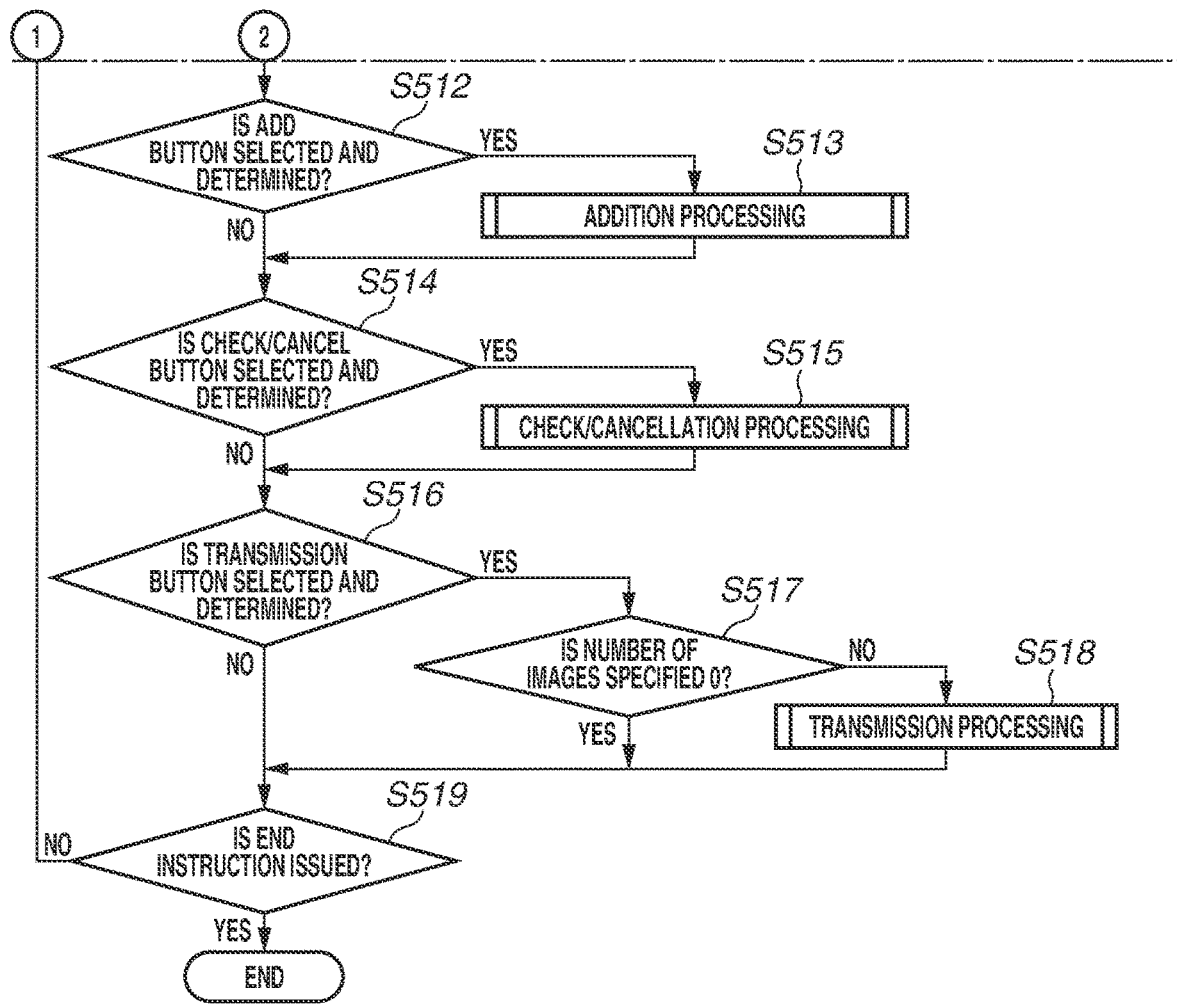

FIGS. 5A and 5B is a detailed flowchart of the cloud development menu processing in step S404 of FIG. 4 described above.

In step S501, the system control unit 50 reads information registered in a transmission reservation list recorded on the recording medium 200. Specifically, the system control unit 50 reads the number of images registered in the transmission reservation list from the recording medium 200.

Figure 9B:
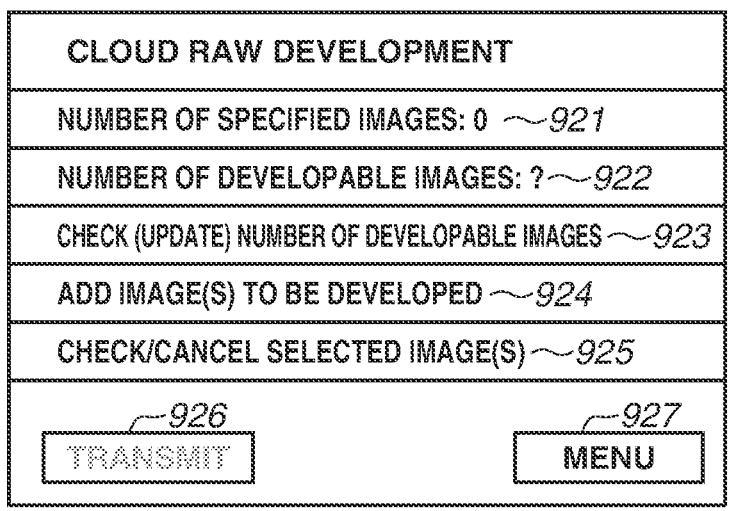
FIGS. 9B to 9F are diagrams illustrating display examples of a cloud development menu.

In step S502, the system control unit 50 displays a cloud development menu on the display unit 28. FIG. 9B illustrates a display example of the cloud development menu. The display contents of the cloud development menu will now be described.

A specified image number display field 921 displays the number of images reserved and registered to be subjected to the cloud development processing by the development server 303. Here, the number of images registered in the transmission reservation list read in step S501 is displayed. The specified image number display field 921 displays "0" in a case where this screen is displayed for the first time without a transmission reservation for the cloud development processing, like immediately after purchase of the digital camera 100 and immediately after full initialization.

A developable image number display field 922 displays the remaining number of images on which the cloud development processing can be performed in a present account currently logged in. As described above, an upper limit of M images per user per month is imposed on the number of images that can be instructed to be developed by the development server 303. The upper limit number is thus also displayed on the UI of the camera 100. When this screen is displayed for the first time, the developable image number display field 922 provides a display like "?", instead of displaying "0", from which a user can identify the number of images as being unknown or yet to be obtained. Such display is performed since the exact number of images developable in the present account is unknown because the connection processing with the cloud storage 301 is not performed before transition from the playback screen to this screen for the purpose of reducing power consumption. Not displaying a number in the developable image number display field 922 until the digital camera 100 connects to the cloud storage 301 and obtains information from the user setting management unit 304 can prevent a user's misunderstanding.

An update button 923 is a GUI button, a display item, or an operation icon for updating the number of developable images displayed in the developable image number display field 922. Based on a selecting and determining operation or a touch operation on the update button 923, the system control unit 50 performs connection processing with the cloud storage 301 and displays the number of developable images obtained from the user setting management unit 304 in the developable image number display field 922.

An add button 924 is a GUI button, a display item, or an operation icon for issuing instructions to select an image or images to be subjected to the cloud development processing by the development server 303. Based on a selecting and determining operation or a touch operation on the add button 924, the screen of the cloud development menu transitions to a screen for adding an image or images to be developed.

A check/cancel button 925 is a GUI button, a display item, or an operation icon for checking an image(s) reserved to be transmitted for the cloud development processing by operating the add button 924, or cancelling a transmission reservation of an image(s) in the transmission reservation list.

A transmission button 926 is a GUI button, a display item, or an operation icon for transmitting the image(s) registered in the transmission reservation list.

A return button 927 is a GUI button for returning from the cloud development menu of FIG. 9B to the playback menu screen of FIG. 9A. The user can also return to the playback menu screen by pressing the menu button 81 instead of directly operating the return button 927.

In step S503, the system control unit 50 determines whether the update button 923 is selected and determined. In a case where the update button 923 is selected and determined (YES in step S503), the processing proceeds to step S504. In a case where the update button 923 is not selected or determined (NO in step S503), the processing proceeds to step S512.

In step S504, the system control unit 50 performs connection processing with a server to obtain information about the upper limit of the number of images (limited number of images) up to which the development processing (cloud development processing) of the development server 303 can be used. The server here refers to at least one of the cloud storage 301, the user setting management unit 304, and the development server 303. The communication unit 54 can connect to the server using a wired connection, such as the Ethernet, or a wireless connection, such as Wi-Fi.

The connection processing establishes a communication session. Once the connection processing is completed (connection is established), the digital camera 100 enters an "online state".

In step S505, the system control unit 50 obtains information about a subscribing/unsubscribing state of the present account to the cloud development processing service and, in a case where the present account is in the subscribing state, the system control unit 50 also obtains the number of developable images from the server (the user setting management unit 304 in particular) via the communication unit 54. The system control unit 50 stores the obtained information in the nonvolatile memory 56. In other words, in a case of the subscribing state, the nonvolatile memory 56 stores the number of developable images, and in a case of the unsubscribing state, the nonvolatile memory 56 stores information indicating non-subscription in the unsubscribing state.

In step S506, the system control unit 50 determines the state of subscription to the cloud development processing service based on the information obtained in step S505. In a case where the cloud development processing service is subscribed (YES in step S506), the processing proceeds to step S507. In a case where the cloud development processing service is not subscribed (NO in step S506), the processing proceeds to step S509.

In step S507, the system control unit 50 performs processing for disconnecting from the server.

In a case where the connection disconnected, the digital camera 100 enters an "offline state".

Figure 9C:
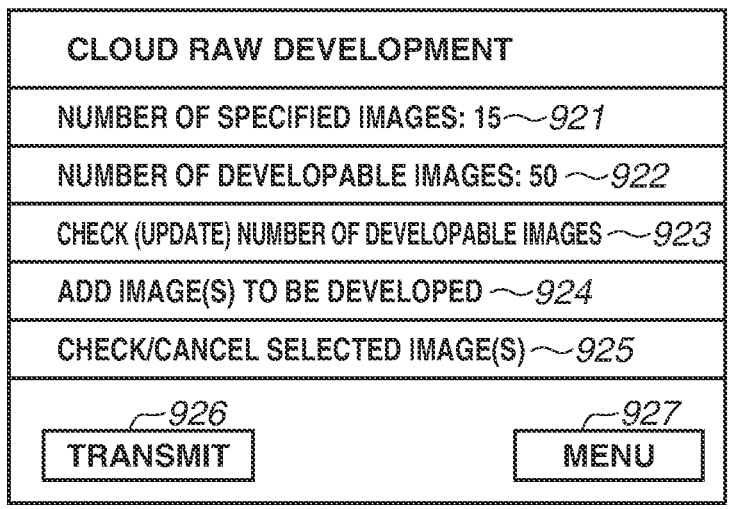

In step S508, the system control unit 50 displays the cloud development menu on the display unit 28 again. In this process, the developable image number display field 922 is updated to display the numerical value of the number of developable images obtained in step S505. FIG. 9C illustrates a display example after the update. FIG. 9C illustrates a case where the information obtained in step S505 notifies that the number of developable images is 50, the display is thus updated with that value. Specifically, the developable image number display field 922 displays 50 which is the updated value. In this process, the date and time of acquisition of the information about the subscribing state to the cloud development processing service may be stored in the nonvolatile memory 56, and the date and time when the number of images displayed in the developable image number display field 922 is last acquired may be displayed each time the cloud development menu is displayed. This enables the user to determine whether the information is the latest or old.

Figure 9D:
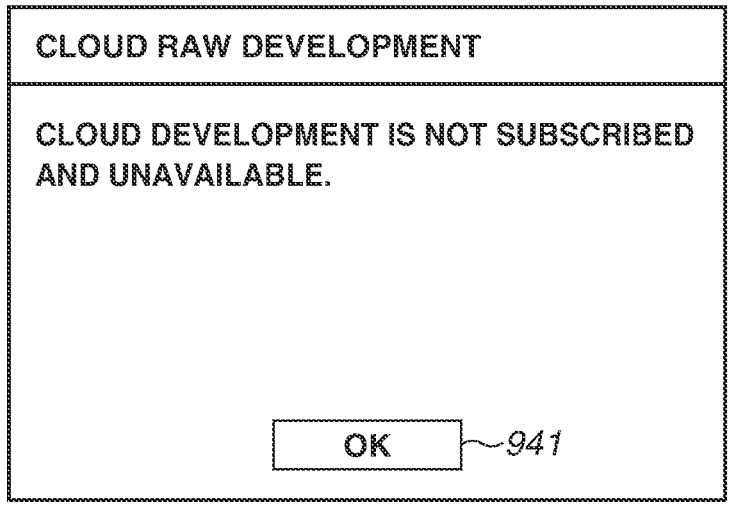
Figure 9E:
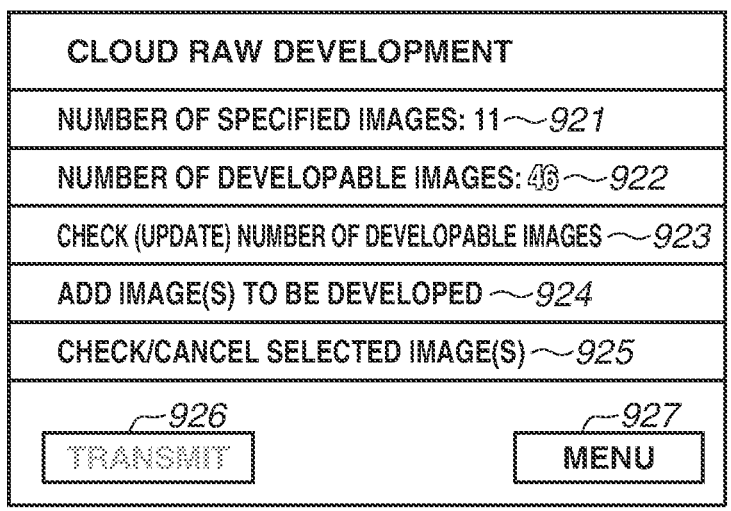

In step S509, the system control unit 50 displays a message that the user has not subscribed to the cloud development processing service yet on a message screen. FIG. 9D illustrates a display example of the message about the non-subscription. In a case where the user checks the message and presses an OK button 941, the processing proceeds to step S510.

In step S510, like the foregoing step S507, the system control unit 50 performs the processing for disconnecting from the server.

In step S511, the system control unit 50 displays the cloud development menu on the display unit 28 again. Since the information obtained in step S505 indicates the unsubscribing state, the developable image number display field 922 displays "?" which is the same display as in the developable image number display field 922 of FIG. 9B.

In step S512, the system control unit 50 determines whether the add button 924 is selected and determined. In a case where the add button 924 is selected and determined (YES in step S512), the processing proceeds to step S513. In a case where the add button 924 is not selected or determined (NO in step S512), the processing proceeds to step S514.

In step S513, the system control unit 50 performs addition processing for adding a raw image(s) to request the cloud development processing, i.e., adding a raw image(s) to the transmission reservation list stored in the recording medium 200.

Details of the addition processing will be described below with reference to FIGS. 6A and 6B.

In step S514, the system control unit 50 determines whether the check/cancel button 925 is selected and determined. In a case where the check/cancel button 925 is selected and determined (YES in step S514), the processing proceeds to step S515. In a case where the check/cancel button 925 is not selected or determined (NO in step S514), the processing proceeds to step S516.

In step S515, the system control unit 50 performs check/cancellation processing for checking/cancelling the raw image(s) to be subjected to the cloud development processing, i.e., raw image(s) of which an image ID or IDs is/are recorded in the transmission reservation list. Details of the check/cancellation processing will be described below with reference to FIG. 7.

In step S516, the system control unit 50 determines whether the transmission button 926 is selected and determined. In a case where the transmission button 926 is selected and determined (YES in step S516), the processing proceeds to step S517. In a case where the transmission button 926 is not selected or determined (NO in step S516), the processing proceeds to step S519.

In step S517, the system control unit 50 determines whether the number of images specified to be subjected to the cloud development processing, i.e., the number of raw images registered in the transmission reservation list stored in the recording medium 200, is 0. In a case where the number of images specified is 0 (YES in step S517), the processing proceeds to step S519. In a case where the number of images specified is not 0 (NO in step S517), the processing proceeds to step S518.

In step S518, the system control unit 50 performs transmission processing for transmitting the raw image(s) registered in the transmission reservation list stored in the recording medium 200 to the cloud storage 301. Details of the transmission processing will be described below with reference to FIGS. 8A and 8B.

In step S519, the system control unit 50 determines whether an instruction to end the display of the cloud development menu is issued, which is, for example, whether the return button 927 is selected and determined, or whether the menu button 81 is pressed. In a case where the end instruction is issued (YES in step S519), the cloud development menu processing ends. In a case where the end instruction is not issued (NO in step S519), the processing returns to step S503.

Figure 6A:
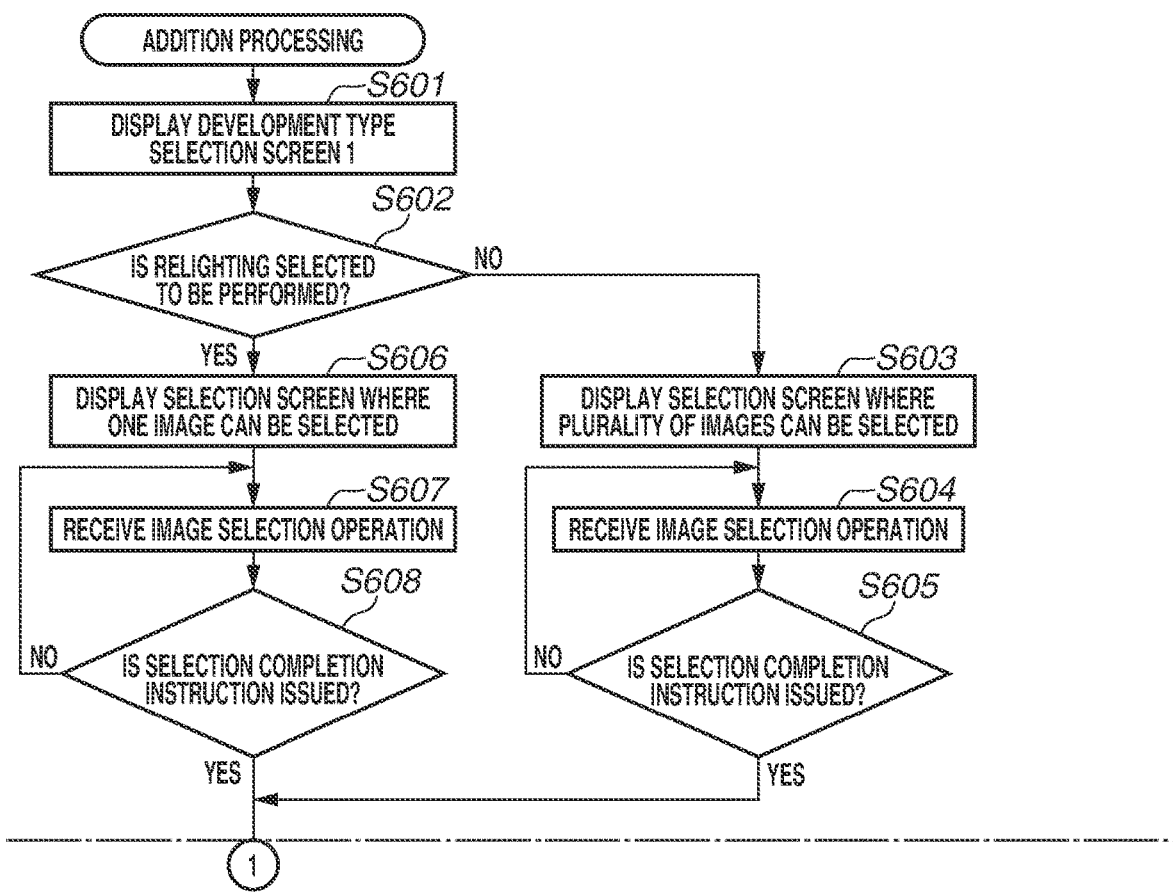

FIGS. 6A and 6B are a detailed flowchart of the addition processing in step S513 of FIG. 5B described above.

In step S601, the system control unit 50 displays a development type selection screen 1 on the display unit 28.

The development type selection screen 1 is a menu screen on which a user can select whether processing is to be performed with or without relighting. In a case where relighting is selected to be performed, relighting parameters become adjustable as development parameters to be adjusted, and the development server 303 is instructed to perform image processing including relighting. In a case where relighting is selected to not be performed, relighting parameters are not provided as development parameters to be adjusted, and the development server 303 is instructed to perform image processing without relighting. Relighting refers to processing for corrections to brighten human faces, shaded portions of faces in particular, in an image, by adjusting parameters such as an angle of application of virtual light to the shaded portions of the faces and the strength thereof. Different parameters are set image by image since shadings by relighting vary from one object to another in an image. The processing load of relighting is high. In the present exemplary embodiment, in a case where relighting is selected to be performed, only one image is thus allowed to be specified at a time. In a case where relighting is selected to not be performed, a plurality of images can be collectively specified.

In step S602, the system control unit 50 determines whether relighting is selected to be performed on development type selection screen 1. In a case where relighting is selected to not be performed (NO in step S602), the processing proceeds to step S603. In a case where relighting is selected to be performed (YES in step S602), the processing proceeds to step S606.

In step S603, the system control unit 50 displays a selection screen where a plurality of images can be selected, which is for example, a list view screen listing thumbnail images of each of the images, on the display unit 28. A display image(s) used in this screen is a Design rule for Camera File system (DCF) thumbnail portion of DisplayImageData 1308 in a raw image file illustrated in FIG. 13 which is read by the system control unit 50 for use in the display. Images already selected to be developed, i.e., images added to the transmission reservation list are not displayed as selection candidates on the list view screen.

In step S604, the system control unit 50 accepts an image selection operation. Specifically, the system control unit 50 performs processing for putting a checkmark on an image to be developed on the foregoing list view screen based on user operations. In the example case of the present exemplary embodiment, checkmarks are put on a plurality of images.

In step S605, the system control unit 50 determines whether an instruction to end the image selection operation, i.e., a selection completion instruction is issued. In a case where an instruction to end the image selection operation (selection completion instruction) is issued (YES in step S605), the processing proceeds to step S609. In a case where an instruction to end the image selection operation is not issued (NO in step S605), the processing returns to step S604.

In step S606, the system control unit 50 displays a selection screen where only one image can be selected, which is for example, a screen displaying a reproduced image, on the display unit 28. The display image used in this screen is a medium-side image of DisplayImageData 1308 in the raw image file illustrated in FIG. 13 which is read by the system control unit 50 for use in the display. Images already selected to be developed, which are images added to the transmission reservation list, are not displayed as selection candidates.

In step S607, the system control unit 50 receives an image selection operation. In a case where the user selects the image displayed on the display unit 28, the user issues a selection completion instruction for the image. In a case where the user wants to select a different image from the one displayed on the display unit 28, the user performs an image switch operation to switch the image displayed on the display unit 28 to another selection candidate. The user can select an image from among the selection candidates by repeating switching until an image to be selected is displayed.

In step S608, the system control unit 50 determines whether an instruction to end the image selection operation (selection completion instruction) is issued. In a case where the end instruction (selection completion instruction) is issued (YES in step S608), the processing proceeds to step S609. In a case where the end instruction is not issued (NO in step S608), the processing returns to step S607.

In step S609, the system control unit 50 displays a development type selection screen 2 on the display unit 28.

The development type selection screen 2 is a menu on which, for the image(s) selected in step S604 or S607, a user selects from among settings used in image capturing or user-set parameters as the development processing parameters to be used in the development server 303 specified by the camera 100. In a case where "image settings" that is an option to use the image settings used in image capturing is selected, the imaging parameters (development parameters) that have been used during the image capturing and recorded in the raw image file(s) are specified. As for a case where user-set parameters are to be used, there is a plurality of options for specifying a developed file format ("fine development into JPEG" and "fine development into HEIF") as options. In a case where "fine development into JPEG" is selected, a preview image is displayed and the user can freely adjust and specify development parameters usable for JPEG development. Images developed by the cloud development processing using these parameters are in a JPEG format. In a case where "fine development into HEIF" is selected, a preview image is displayed and the user can freely adjust and specify development parameters usable for HEIF development. Images developed by the cloud development processing using these parameters are in a HEIF format.

In step S610, the system control unit 50 determines whether "imaging settings" is selected and determined on development type selection screen 2. In a case where "imaging settings" is selected and determined (YES in step S610), the processing proceeds to step S611. In a case where "imaging settings" is not selected or determined (NO in step S610), the processing proceeds to step S612.

In step S611, the system control unit 50 temporarily develops the image(s) using the imaging settings and provides a preview display on the display unit 28. Specifically, the system control unit 50 reads RecParameter 1305 illustrated in FIG. 13 from the selected raw image file(s), and performs development processing on ImageData 1309 that is raw data which is undeveloped image(s). The system control unit 50 displays the image(s) resulting from the development processing on the display unit 28 as a preview image(s). The user can check visual impression of an outcome of the development on the display unit 28 before submission to the development server 303. The result of the development by the development server 303 will not be exactly the same as the preview display, because of additional sophisticated image processing. The processing proceeds to step S622.

In step S612, the system control unit 50 determines whether "fine development into JPEG" is selected and determined on development type selection screen 2. In a case where "fine development into JPEG" is selected and determined (YES in step S612), the processing proceeds to step S613. In a case where "fine development into JPEG" is not selected or determined (NO in step S612), the processing proceeds to step S617.

In step S613, the system control unit 50 displays a development parameter setting screen for generating a JPEG file on the display unit 28.

Figure 10:
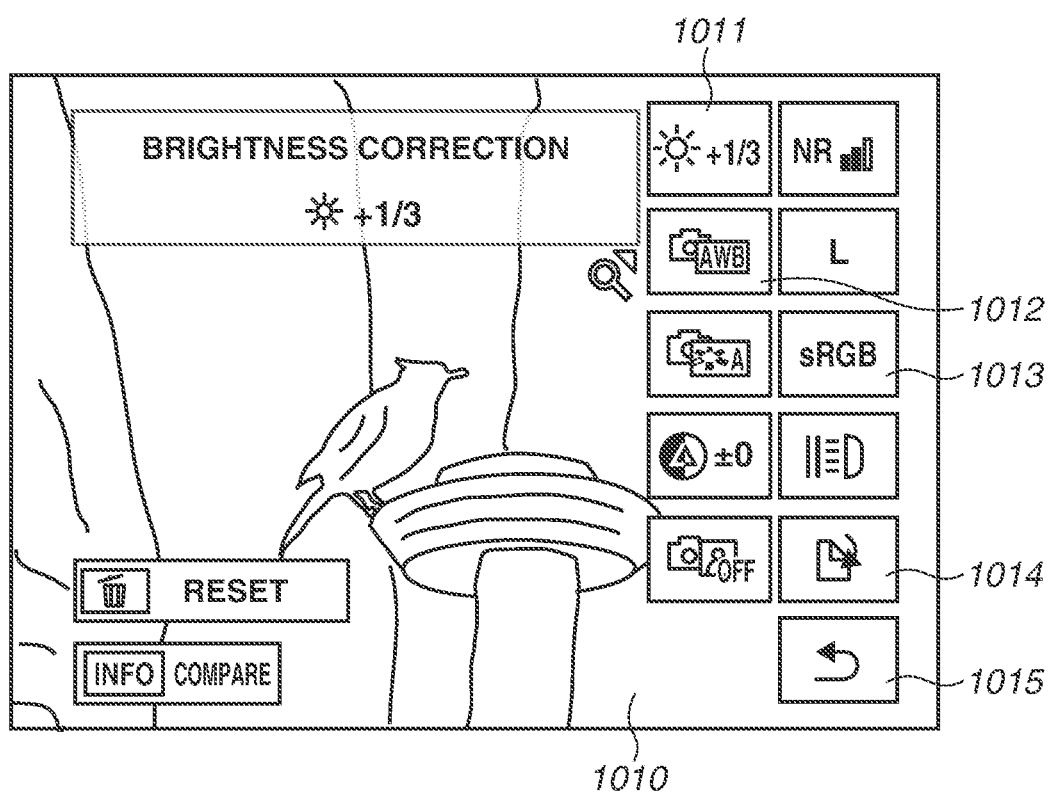
FIG. 10 is a diagram illustrating a display example of a development parameter setting screen.

FIG. 10 illustrates a display example of the development parameter setting screen. The development parameter setting screen displays a preview image 1010 and a plurality of display items (icons) corresponding to a respective plurality of types of development parameters that can be adjusted by the user. For example, brightness can be changed by selecting an icon 1011, white balance can be changed by selecting an icon 1012, and color space parameters can be changed by selecting an icon 1013.

The icons corresponding to the respective types of development parameters indicate setting values currently set as those types of development parameters. The user can select one of the plurality of icons corresponding to the types of development parameters, for example, by moving a selection cursor using the four-way directional pad 74, and adjust the selected type of parameter by adjustment operations, for example, by operating the main electronic dial 71. Even on the development parameter setting screen, like step S611, the development processing using the settings used in image capturing is performed to provide a preview display for the first time. In a case where a plurality of raw image files is selected in the foregoing S605, the raw image file of the earliest capturing date and time among the selected raw image images is developed using the settings used in the image capturing and displayed on the display unit 28.

In step S614, the system control unit 50 determines whether an operation to adjust any one of the adjustable types of development parameters (parameter change operation) is performed on the development parameter setting screen. In a case where a parameter change operation is performed (YES in step S614), the processing proceeds to step S615. In a case where a parameter change operation is not performed (NO in step S614), the processing proceeds to step S616.

In step S615, the system control unit 50 changes the development parameter based on the parameter change operation. In the present exemplary embodiment, the changed development parameter is recorded into the system memory 52 in step S615. However, like step S624 to be described below, a recipe of the raw image file may be updated with the changed development parameter. The system control unit 50 also performs development processing for a preview display based on the changed development parameter. For example, in a case where the icon 1011 is selected and a parameter change operation for increasing brightness by one level is performed, the system control unit 50 performs development processing on ImageData 1309 that is the raw data (undeveloped image) in such a manner that the brightness increases by one level. The system control unit 50 then updates the preview image 1010 with the image developed by this development processing. The visual impression of an outcome can thus also be checked in step S615 before submission to the development server 303.

In step S616, the system control unit 50 determines whether an instruction (save instruction) to save the development parameter(s) adjusted (changed) on the development parameter setting screen is issued. In a case where the save instruction is issued (for example, a save button 1014 displayed on the development parameter setting screen is selected and determined) (YES in step S616), the processing proceeds to step S622. In a case where the save instruction is not issued (NO in step S616), the processing returns to step S614.

In step S617, the system control unit 50 determines whether "fine development into HEIF" is selected and determined on development type selection screen 2. In a case where "fine development into HEIF" is selected and determined (YES in step S617), the processing proceeds to step S618. In a case where "fine development into HEIF" is not selected or determined (NO in step S617), the processing proceeds to step S622.

In step S618, the system control unit 50 displays a development parameter setting screen for generating a HEIF file on the display unit 28. The development parameter setting screen for generating a HEIF file is similar to the development parameter setting screen illustrated in FIG. 10. Examples of the changeable development parameters include brightness and white balance. Changes to some types of parameters may be restricted. For example, unlike the generation of a JPEG file, color space parameters may be fixed to predetermined values. JPEG development parameters and HEIF development parameters that are changeable (adjustable) may include at least one different type of development parameter.

The processing of steps S619 to S621 is similar to that of the foregoing steps S614 to S616. A description thereof will thus be omitted.

In step S622, the system control unit 50 displays a message for confirming whether to save the current content (selected image(s) and adjusted development parameter(s)), an OK button for determining to save the current content, and a cancel button for cancelling the adjustments on the display unit 28.

In step S623, the system control unit 50 determines whether the OK button for determining to save the current content is selected and determined on the message display screen displayed in step S622. In a case where the OK button is selected and determined (YES in step S623), the processing proceeds to step S624. In a case where the cancel button is selected and determined (NO in step S623), the processing returns to step S609.

In step S624, the system control unit 50 performs processing for saving the current content (selected image(s) and adjusted parameter(s)). Specifically, the system control unit 50 records an image ID(s) (such as a file name(s) and a unique ID(s)) indicating the selected raw image file(s) into the transmission reservation list stored in the recording medium 200 as information indicating the image(s) reserved to be transmitted. The system control unit 50 also overwrites a RecipeData 1306 section of the selected raw image file(s) recorded on the recording medium 200 with the set of adjusted development parameters as information to be used when the development server 303 performs the cloud development processing. The RecipeData 1306 section will be described below with reference to FIG. 13.

For example, in a case where 15 images are selected and determined in step S605, brightness is increased by one level in step S615, and the OK button is selected and determined in step S623, the system control unit 50 overwrites and saves the RecipeData 1306 section in each of the selected 15 raw image files with information "brightness: +1" in succession. The system control unit 50 then saves the image IDs of the 15 images into the transmission reservation list.

In step S624, the RecipeData 1306 section of the selected raw image file(s) is overwritten. This can prevent a raw image file 1300 from changing in data size. Meanwhile, DisplayImageData 1308 is not updated and maintained the same as before the reflection of the set of adjusted development parameters. The reasons are described as follows. DisplayImageData 1308 is unable to be restored once overwritten and saved based on the image developed using the set of adjusted development parameters. Saving the image developed using the set of adjusted development parameters into a different area of the raw image file 1300 increases the data size of the raw image file 1300. Since the sophisticated types of development processing available in the cloud development processing are unable to be reflected, the set of adjusted development parameters is not reflected in a strict sense.

In step S625, the system control unit 50 updates the specified image number display field 921 based on the transmission reservation list stored in step S624, and displays the cloud development menu on the display unit 28. For example, in a case where 15 raw image images are registered in the transmission reservation list, the specified image number display field 921 is updated to display "15".

Figure 7:
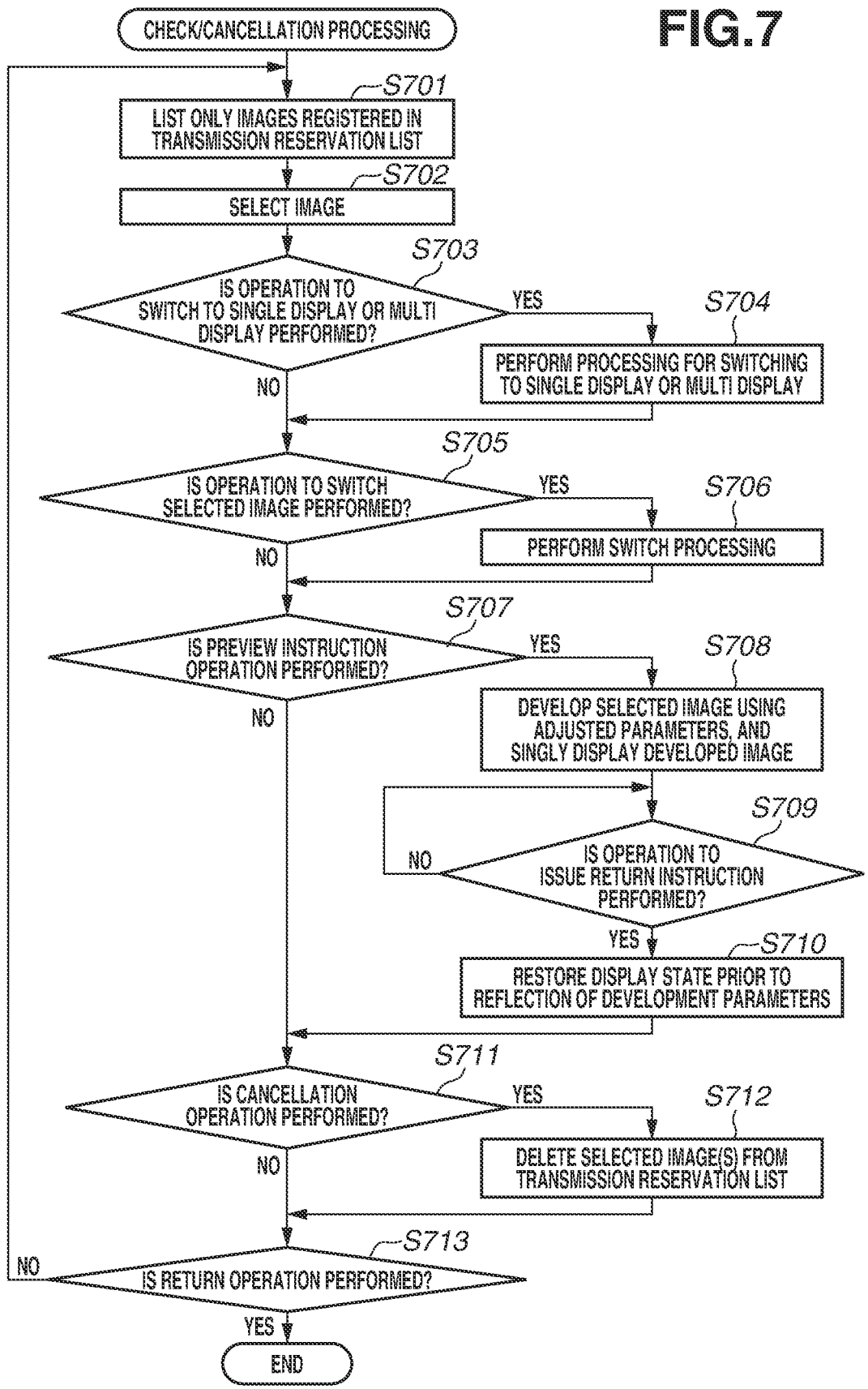
FIG. 7 is a flowchart of check/cancellation processing.

FIG. 7 is a detailed flowchart of the check/cancellation processing in step S515 of FIG. 5B described above.

In step S701, the system control unit 50 lists images that are registered as reserved to be transmitted in the transmission reservation list recorded on the recording medium 200 on the display unit 28.

Figure 11A:
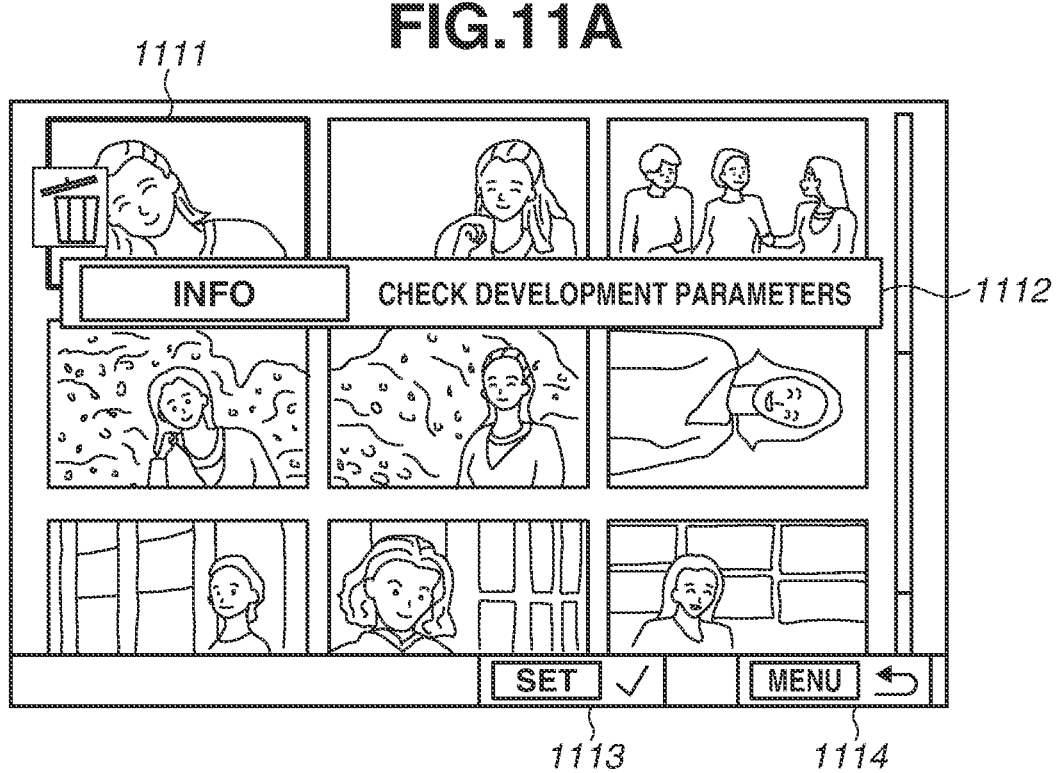
FIG. 11A is a diagram illustrating a display example of a list view of reserved images.

FIG. 11A illustrates a display example of the list view of the reserved images displayed in step S701. For example, in an example case where 15 images are registered as reserved images in the transmission reservation list, the system control unit 50 reads a thumbnail image for the display from DisplayImageData 1308 of each of the 15 reserved raw image files, and lists the thumbnail images. The thumbnail images displayed in the list are not ones obtained by developing ImageData 1309 using the development parameters adjusted when the images are added to the transmission reservation list, and thus the development parameters specified by the user are not reflected. The list view screen displays a plurality of thumbnail images as well as a cursor 1111 for image selection, an operation guide 1112, a button 1113, and a button 1114. The operation guide 1112 is an operation guide notifying that an instruction to provide a preview display using the adjustment parameters (development parameters) saved when the images are added to the transmission reservation list can be issued by pressing an INFO button included in the operation unit 70. The button 1113 is a GUI button for receiving an instruction to perform cancellation processing on the transmission reservation list. The button 1113 also serves as an operation guide notifying that the instruction to perform the cancellation processing on the transmission reservation list can also be issued by pressing the set button 75. The button 1114 is a GUI button for receiving an instruction to return to the previous screen. The button 1114 also serves as an operation guide notifying that the instruction to return to the previous screen can also be issued by pressing the menu button 81.

In step S702, the system control unit 50 performs processing for selecting an image. In the processing, the cursor 1111 is initially located at the top left image on the list view screen, i.e., the oldest image.

In step S703, the system control unit 50 determines whether an operation to switch to a single display or a multi display (list display) is performed on the list view screen. In a case where the switch operation is performed (YES in step S703), the processing proceeds to step S704. In a case where the switch operation is not performed (NO in step S703), the processing proceeds to step S705.

In step S704, the system control unit 50 performs processing for switching to a single display or a multi display. In a case where the display before the switching is a list display and an operation to switch to a single display (pinch-out or the pressing of the zoom button 78) is performed, the system control unit 50 switches to a single display of a raw image where the cursor 1111 is located before the switching. In the single display, the system control unit 50 reads a medium-sized image in DisplayImageData 1308 of the raw image file to be displayed, and displays the medium-sized image on the display unit 28. In a case where the display before the switching is a single display and an operation to switch to a multi display (pinch-in or the pressing of the AE lock button 77) is performed, the system control unit 50 switches to a list display and displays the cursor 1111 on the thumbnail image corresponding to an image single-displayed before the switching. In the list display, the system control unit 50 reads a thumbnail image in DisplayImageData 1308 of each raw image file, and displays the thumbnail images.

In step S705, the system control unit 50 determines whether an operation to switch the selected image is performed. This operation refers to an operation for moving the cursor 1111 up, down, to the left, or to the right in the list display state, and an image fast-forward operation in the single display state. Any of these operations can be performed by operating the four-way directional pad 74. In a case where an operation to switch the selected image is performed (YES in step S705), the processing proceeds to step S706. In a case where an operation to switch the selected image is not performed (NO in step S705), the processing proceeds to step S707.

In step S706, the system control unit 50 performs switch processing. This processing refers to processing for moving the cursor 1111 in a direction of an operation in the list display state, and processing for switching to the previous or next image in the single display state. Thus, the reserved images registered in the transmission reservation list can be selected in succession.

In step S707, the system control unit 50 determines whether a preview instruction operation (for example, the pressing of the INFO button indicated by the operation guide 1112) is performed. In a case where a preview instruction operation is performed (YES in step S707), the processing proceeds to step S708. In a case where a preview instruction operation is not performed (NO in step S707), the processing proceeds to step S711.

In step S708, the system control unit 50 develops the selected image (the image inside the cursor 1111 in the list display state, or the image displayed on the display unit 28 in the single display state) and singly displays the developed image. Specifically, the system control unit 50 reads development parameter information from RecipeData 1306 where the development parameters adjusted when the image is added to the transmission reservation list are recorded, instead of RecParameter 1305 of the selected raw image file. The system control unit 50 then performs development processing on ImageData 1309 that is the raw data (undeveloped image) using the development parameters, and displays the resulting image on the display unit 28 as a preview image (provides a preview display).

Figure 11B:
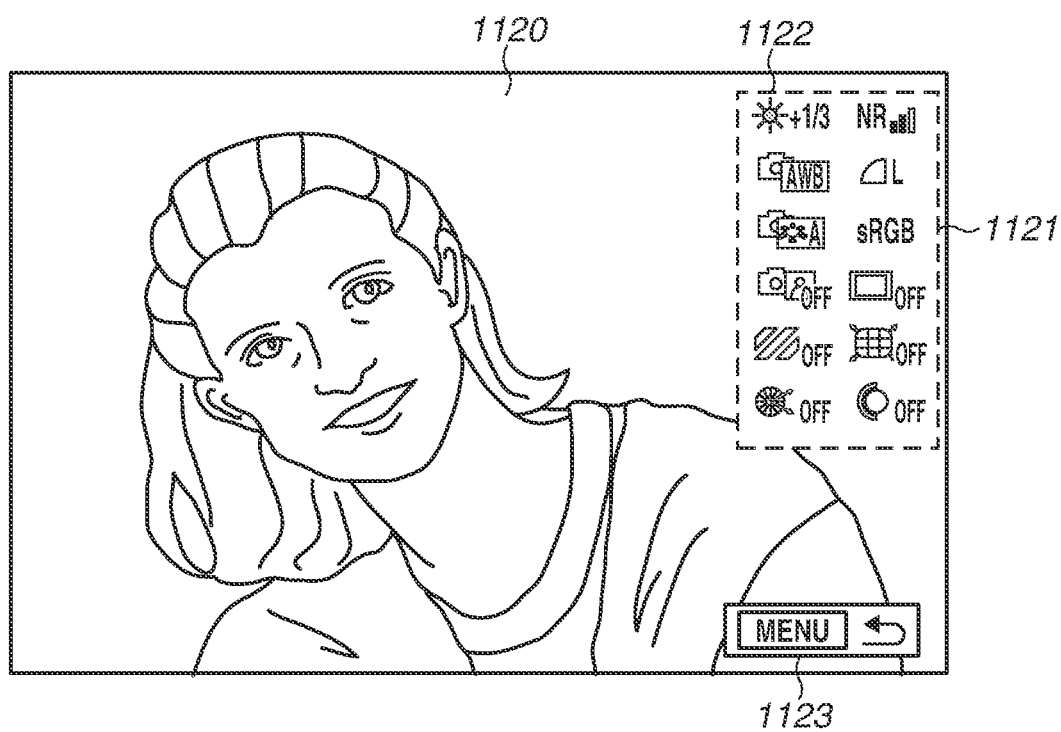
FIG. 11B is a diagram illustrating a display example of a preview display.

FIG. 11B illustrates a display example of the preview display in step S708. A preview image 1120 is an image of which development parameters adjusted when the image is added to the transmission reservation list are reflected, in other words, an image developed using the development parameters. Strictly speaking, the preview image 1120 is not exactly the same as the image to be developed by the cloud raw development using the development parameters adjusted when the image is added to the transmission reservation list, since the cloud raw development includes sophisticated development processing. Information 1121 which is indicated in a section surrounded by a dotted line is about a group of development parameters obtained from RecipeData 1306 of the displayed raw image file, and is displayed along with the preview image 1120. Among the development parameters, types of development parameters changed from the image settings are displayed in a different display form, for example, different color, from that of the other types of development parameters, whereby the changes are identifiable. In the illustrated example, only information 1122 indicating a brightness development parameter is displayed to be distinguishable from other pieces of information. This notifies that only the brightness has been changed from the image settings. A button 1123 that is a GUI button for receiving an instruction to end the preview state and return to the previous screen is also displayed. The button 1123 also serves as a guide notifying that the menu button 81 can also be pressed to return to the previous screen.

In step S709, the system control unit 50 determines whether an operation to issue a return instruction which is selection and determination of the button 1123 or the pressing of the menu button 81 is performed. In a case where an operation to issue a return instruction is performed (YES in step S709), the processing proceeds to step S710. In a case where an operation to issue a return instruction is not performed (NO in step S709), the processing returns to step S709.

In step S710, the system control unit 50 restores the display state prior to the reflection of the development parameters. In other words, the system control unit 50 restores the display state prior to the receipt of the preview instruction in step S707.

In step S711, the system control unit 50 determines whether a cancellation operation to issue an instruction to perform cancellation processing which is selection and determination of the button 1113 or pressing of the set button 75 is performed. In a case where a cancellation operation is performed (YES in step S711), the processing proceeds to step S712. In a case where a cancellation operation is not performed (NO in step S712), the processing proceeds to step S713.

In step S712, the system control unit 50 cancels the reservation of the currently selected image, which is the image on which the cursor 1111 is located in the multi display, or the image displayed in the single display, in the transmission reservation list. The image ID of the selected image is thereby deleted from the transmission reservation list recorded on the recording medium 200, or information notifying that the selected image is not reserved (reservation-cancelled) is recorded. The information in RecipeData 1306 in the raw image file of the selected image is also deleted. The development parameters adjusted by the user when the image is added to the transmission reservation list are thereby discarded. More than one image may be selected in a collective manner. In a case where displaying the cloud development menu next time after the cancellation processing, the system control unit 50 subtracts the number of cancelled images from the foregoing number of images displayed in the specified image number display field 921 and displays the result.

In step S713, the system control unit 50 determines whether a return operation which is selection and determination of the button 1114 or the pressing of the menu button 81 is performed. In a case where a return operation is performed (YES in step S713), the check/cancellation processing of FIG. 7 ends, and the screen returns to the cloud development menu. In a case where a return operation is not performed (NO in step S713), the processing returns to step S701. In a case where the cancellation processing is performed in step S712 and the screen returns to the cloud development menu, the system control unit 50 updates the number of images displayed in the specified image number display field 921.

Figure 8A:
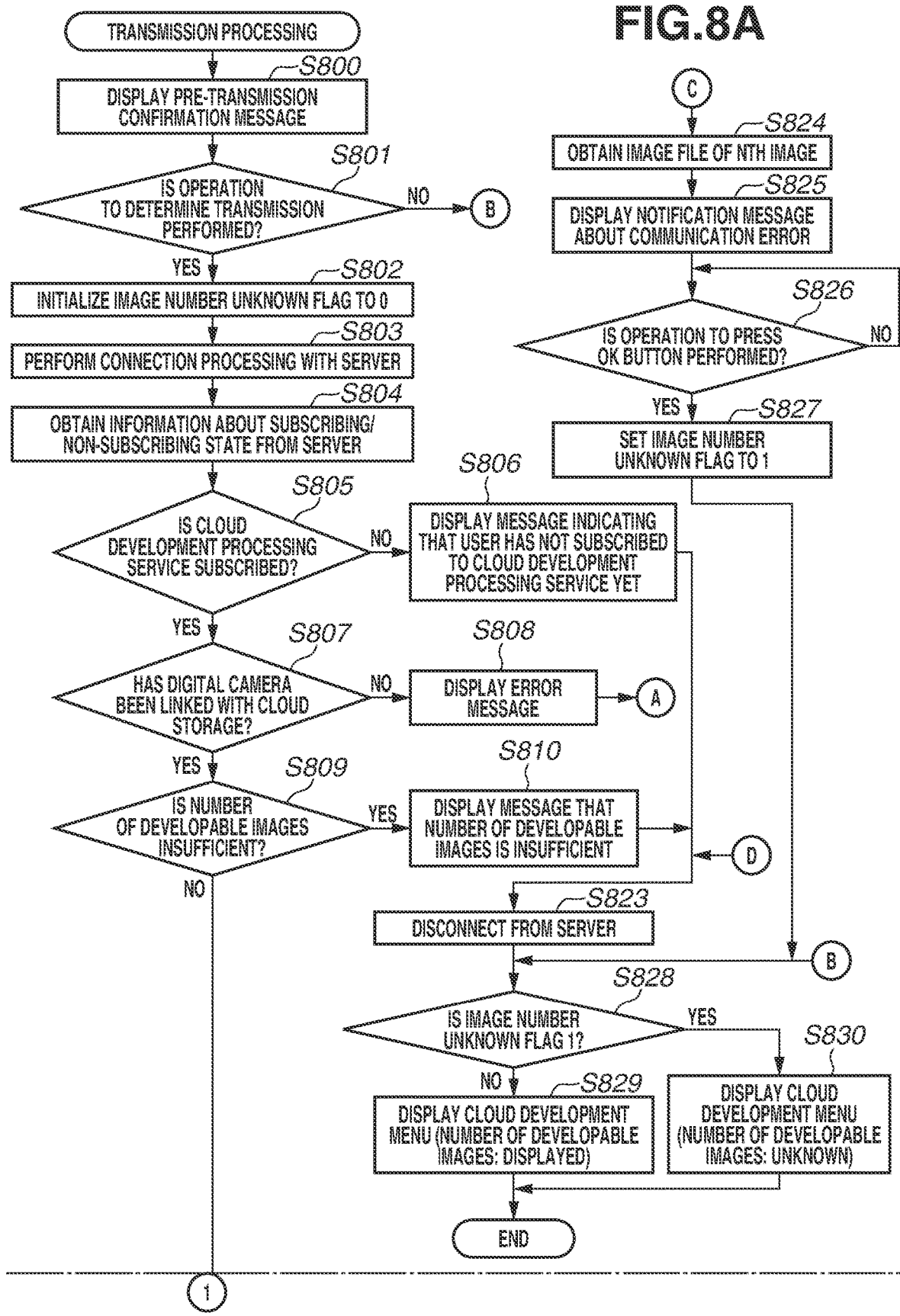
FIGS. 8A and 8B are a flowchart illustrating transmission processing.
Figure 8B:
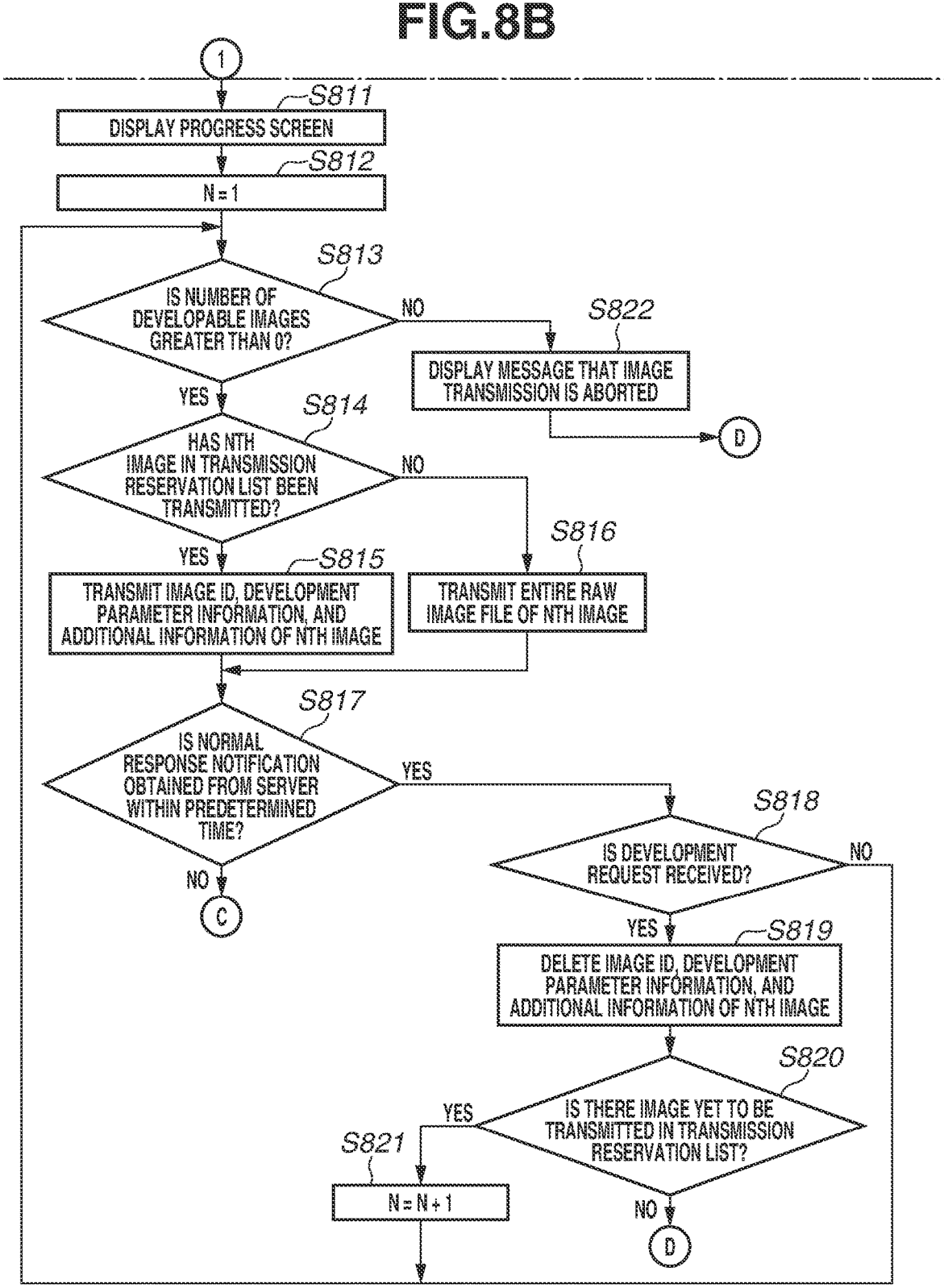

FIGS. 8A and 8B is a detailed flowchart of the transmission processing in step S518 of FIG. 5B described above.

In step S800, the system control unit 50 displays a pre-transmission confirmation message (guidance) on the display unit 28 before connecting to the server.

Figure 12A:
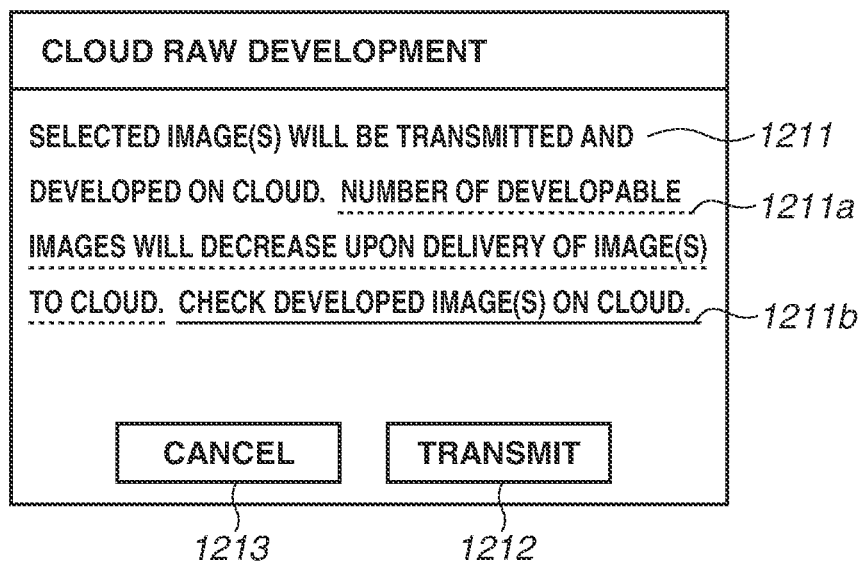
FIG. 12A is a diagram illustrating a display example of a pre-transmission confirmation message.
Figure 13:
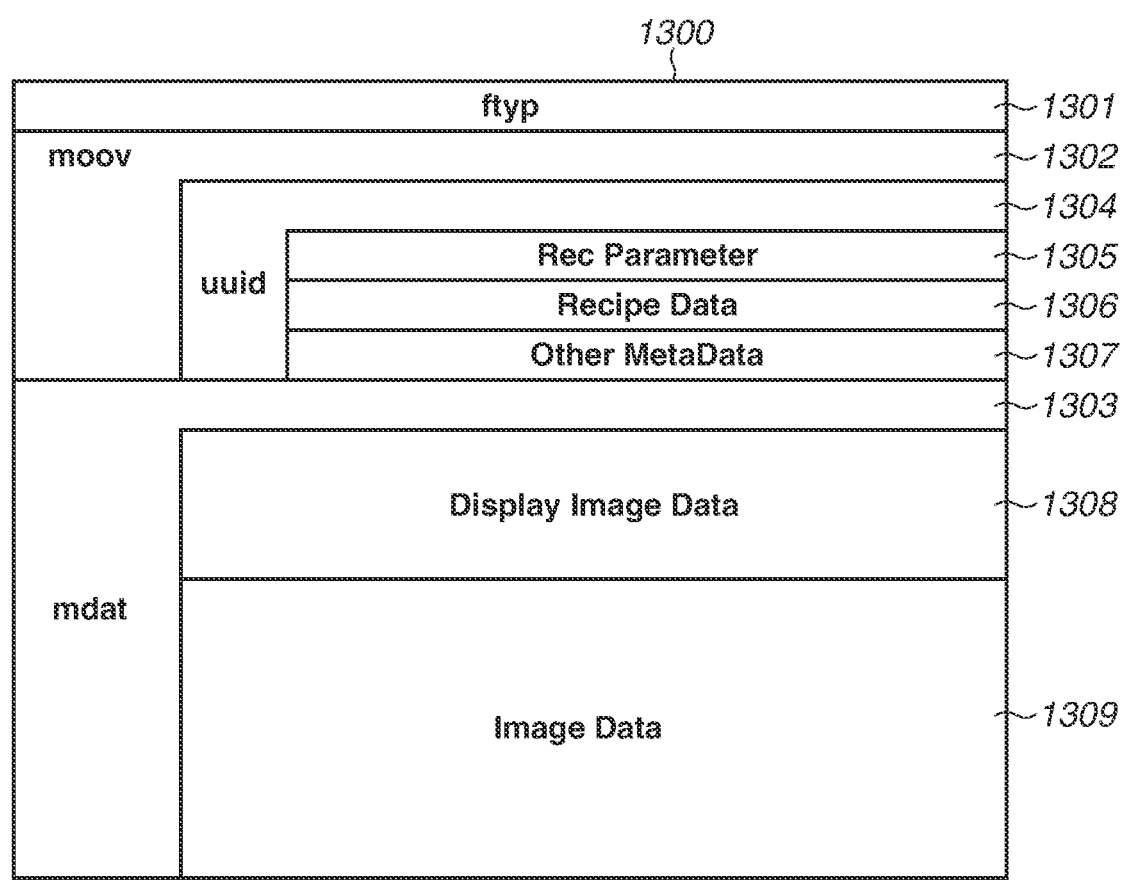
FIG. 13 is a diagram illustrating a file structure.

FIG. 12A illustrates a display example of the pre-transmission confirmation message displayed in step S801. The displayed screen displays a confirmation message 1211, a transmission button 1212 for issuing an instruction to determine transmission after viewing the confirmation message 1211, and a cancel button 1213 for issuing an instruction to cancel transmission after viewing the confirmation message 1211. The confirmation message 1211 includes a message that when the transmission button 1212 is selected and determined, the image(s) registered in the transmission reservation list is/are transmitted to the cloud storage 301.

The confirmation message 1211 includes a message 1211*a* notifying that the number of developable images, which is the number displayed in the developable image number display field 922, will decrease as many as the number of transmitted images upon completion of the transmission. In other words, the system control unit 50 notifies the user that the remaining number of times of use of the cloud processing up to a limited number of times M will decrease in response to transmission of information for issuing an instruction for the cloud development processing, regardless of the remaining number of times up to the limited number of times M managed by the development server 303. The message 1211*a* corresponds to the part underlined with the dotted line which is actually not displayed. In the illustrated example, "NUMBER OF DEVELOPABLE IMAGES WILL DECREASE UPON DELIVERY OF IMAGE(S) TO CLOUD" is displayed. The message 1211*a* is not limited thereto, and that the number of developable images is limited account by account and that the number of developable images is provided on a charging basis may be displayed. Examples of the message include the following messages: "The number of developable images will decrease upon delivery of the image(s) to the server. The number of developable images will not increase until next month", "The number of developable images purchased will decrease upon delivery of the image(s) to the server", and "The number of developable images will decrease upon delivery of the image(s) to the server. The number of developable images can be increased by purchasing". Such a guidance display can inform the user that the number of developable images decreases when the cloud development processing is performed, before transmission of image(s). This enables the user to use the cloud development processing in a well-planned manner and avoid a risk of inconvenience. For example, the guidance display can prevent the occurrence of a situation where the number of images developable by the cloud development processing is first used up by images of low priority and the cloud development processing becomes unavailable for images of high priority to be subsequently transmitted.

The confirmation message 1211 includes a message 1211*b* notifying that a result of the cloud development processing by the development server 303 should be checked using a device different from the digital camera 100 like the smartphone 302, in other word, a different device is recommended for browsing the result. The message 1211*b* corresponds to the part underlined with the solid line which is actually not displayed. In the illustrated example, "CHECK DEVELOPED IMAGE(S) ON CLOUD" is displayed. The message 1211*b* is not limited thereto, and that the developed image(s) can be checked by connecting to the cloud storage 301 using a device different from the digital camera 100 may be displayed. A message notifying that the developed image(s) can be checked by connecting to the cloud storage 301 using a device different from the digital camera 100 using a user account where the digital camera 100 is associated with the cloud storage 301 may be displayed. Devices different from the digital camera 100 include at least one of a smartphone, a PC, and a tablet terminal. A message notifying that developed image(s) processed by the cloud development processing (image-processed image(s)) is/are unable to be immediately checked on the display unit 28 of the digital camera 100 may be displayed. Examples of the messages include the following messages: "To check developed image(s), log in to your account subscribed to the service using your smartphone, PC, or tablet terminal" and "To check the developed image (s), connect to the cloud service using a device other than this camera". A message notifying that a developed image(s)

is/are unable to be immediately checked may be added as follows: "The development processing may take long. Please check later" and "Check image(s) after receipt of the development processing completion notification". In the present exemplary embodiment, the digital camera 100 does not receive a developed image(s) processed by the cloud development processing by the development server 303 and recorded in the cloud storage 301. However, the message 1211b informs the user that a processing result is to be stored in a location other than the camera 100 from which the instruction has been transmitted. This enables the user to check a developed image(s) using another device without confusion.

In step S801, the system control unit 50 determines whether an operation to determine transmission, which is selection and determination of the transmission button 1212 or the pressing of the set button 75, is performed after the confirmation message of FIG. 12A is displayed. In a case where the operation to determine the transmission is performed (YES in step S801), the processing proceeds to step S802. On the other hand, in a case where a cancel operation, which is selection and determination of the cancel button 1213 or the pressing of the menu button 81, is performed (NO in step S801), the processing proceeds to step S828. In step S802, the system control unit 50 initializes an image number unknown flag stored in the system memory 52 to 0. The initialized image number unknown flag=0 notifies that a correct number of developable images is obtained. In a case where the image number unknown flag=1, it indicates the possibility that the correct number of developable images may not have been obtained because a processing result is not available from the server.

In step S803, like step S504, the system control unit 50 performs connection processing with the server, which is at least one of the cloud storage 301, the user setting management unit 304, and the development server 303. With the connection processing completed (connection established), the digital camera 100 enters the "online state".

In step S804, like the foregoing step S505, the system control unit 50 obtains information about the subscribing/unsubscribing state of a present account currently logged in to the cloud development processing service and, in a case where the present account is in the subscribing state, the system control unit 50 also obtains the number of developable images from the server, which is the user setting management unit 304 in particular. The system control unit 50 performs information acquisition which has been performed in the display processing of the cloud development menu again in this step S804 of the transmission processing. The reason is that the number of images developable by the cloud development processing for the same user ID (account) can change due to factors other than the development instruction from the digital camera 100. Examples of the factors for the change include as follows: The number of developable images can be decreased by a development request issued to the development server 303 from a different device linked with the user ID (account) other than the digital camera 100. In the case of a subscription service where the number of developable images is set on a monthly basis, the number of developable images can be increased next month. The cloud development processing service can be terminated (unsubscribed). The link setting between the digital camera 100 and the cloud storage 301 can be reset. Since the situation can be changed due to such factors, the system control unit 50 obtains the latest information before transmission. This can reduce occurrences of errors after transmission is started.

In step S805, the system control unit 50 performs a similar determination to that in the foregoing step S506. In a case where the cloud development processing service is subscribed (YES in step S805), the processing proceeds to step S807. In a case where the cloud development processing service is not subscribed (NO in step S805), the processing proceeds to step S806. In step S806, like the foregoing step S509, the system control unit 50 displays a message screen notifying that the user has not subscribed to the cloud development processing service on the display unit 28. The processing then proceeds to step S823.

In step S807, like step S403, the system control unit 50 determines whether the digital camera 100 has been linked (paired) with the cloud storage 301. In a case where the digital camera 100 has been linked with the cloud storage 301 (YES in step S807), the processing proceeds to step S809. In a case where the digital camera 100 has not been linked with the cloud storage 301, i.e., the link is cancelled (NO in step S807), the processing proceeds to step S808. In step S808, the system control unit 50 displays an error message that the link is cancelled on the display unit 28. The processing then returns to step S401.

In step S809, the system control unit 50 determines whether the number of developable images is insufficient for the number of images to be transmitted, which is the number of images registered in the transmission reservation list. In a case where the number of developable images is insufficient (YES in step S809), the processing proceeds to step S810. In a case where the number of developable images is not insufficient (NO in step S809), the processing proceeds to step S811.

Figure 12B:
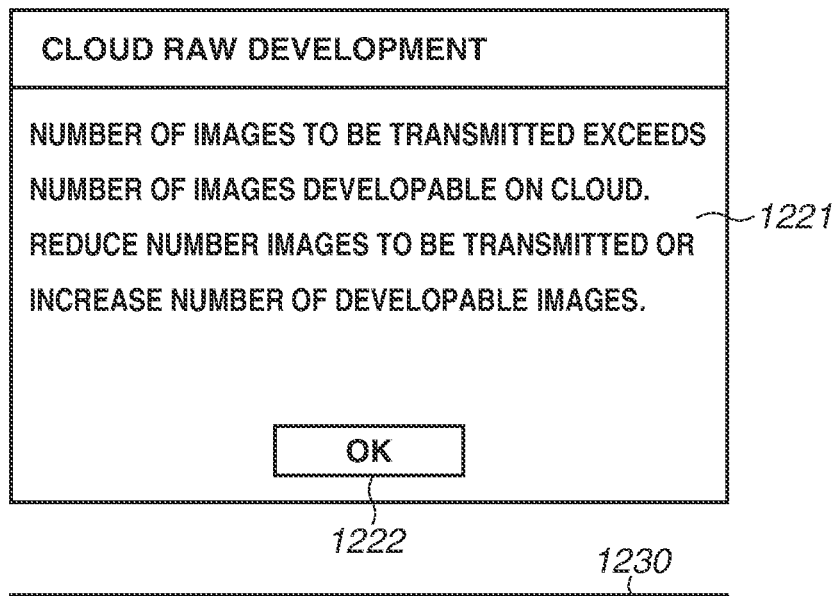
FIG. 12B is a diagram illustrating a display example of a message that the number of developable images is insufficient.

In step S810, the system control unit 50 displays a message (guidance) notifying that the number of developable images is insufficient on the display unit 28. FIG. 12B illustrates a display example of the message notifying that the number of developable images is insufficient, displayed in step S810. A confirmation message 1221 notifies the user that the number of images to be transmitted exceeds the number of images capable of being processed by the cloud development processing in the development server 303. The confirmation message 1221 may include content for prompting the user to reduce the images to be transmitted, or content for prompting the user to increase the number of developable images if the cloud development processing service is a paid service. The system control unit 50 also displays an OK button 1222 for proceeding to the next screen. The processing then proceeds to step S823.

In step S811, the system control unit 50 displays a progress screen notifying that transmission is in progress on the display unit 28. For example, the progress screen provides a progress display providing, for example, the number of images transmitted/the total number of images to be transmitted, or a progress display providing transmitted percentages in the transmission.

In step S812, the system control unit 50 initializes N, which is a variable indicating the number of images transmitted after the determination of the transmission, to 1. The system control unit 50 stores N=1 into the system memory 52.

In step S813, the system control unit 50 determines whether the number of developable images is greater than 0. Specifically, the system control unit 50 obtains the number of images developable by the cloud developing processing in the present account from the user setting management unit 304 again, and determines whether the number of developable images is greater than 0. In a case where the number of developable images is greater than 0 (YES in step S813), the processing proceeds to step S814. In a case where the number of developable image is 0 (NO in step S813), the processing proceeds to step S822. In step S813, the system control unit 50 obtains the number of developable images from the user setting management unit 304 again, and performs the determination using the number. The system control unit 50 stores the number of developable images obtained from the user setting management unit 304 into the system memory 52.

In step S814, the system control unit 50 determines whether the Nth image in the transmission reservation list has already been transmitted to the cloud storage 301. This determination is performed in the following manner. The system control unit 50 initially transmits an ID, which is a unique ID uniquely assigned to each image, of an image of the Nth image in the transmission reservation list from the digital camera 100 to the cloud storage 301, and inquires the cloud storage 301 whether a main body of the image has been transmitted. The cloud storage 301 in response searches to determine whether an image matching the transmitted image ID is stored. In a case where a matching image is found, the cloud storage 301 transmits a notification to the digital camera 100 that the image has already been transmitted to the cloud storage 301. In a case where no matching image is found, the cloud storage 301 transmits a notification to the digital camera 100 that the image has not been transmitted to the cloud storage 301. In a case where the notification that the image has been transmitted is received as a response to the inquiry to the cloud storage 301, the system control unit 50 determines that the image has been transmitted. In a case where the notification that the image has not been transmitted is received as a response to the inquiry to the cloud storage 301, the system control unit 50 determines that the image has not been transmitted. In a case where the image has been transmitted (YES in step S814), the processing proceeds to step S815. In a case where the image has not been transmitted (NO in step S814), the processing proceeds to step S816. Such a determination can prevent the same image from being transmitted to the cloud storage 301 a plurality of time, and reduce consumption of the communication time, communication power, and communication capacity due to a plurality of times of transmission. For example, the digital camera 100 has a function of automatically transmitting a captured image to the cloud storage 301 after imaging for archival purposes aside from transmitting an image for the purpose of using the cloud development processing service. If such a function is used, the same raw image file can already be stored in the cloud storage 301. The determination of step S814 can prevent the same file from being redundantly transmitted even in a case where a plurality of functions related to image transmission is utilized.

In step S815, the system control unit 50 performs processing for transmitting the image ID of the Nth image in the transmission reservation list and the development parameter information and additional information included in the raw image file of the image having the image ID as information for issuing an instruction for the cloud development processing (development request). Specifically, the system control unit 50 extracts RecipeData 1306 and OtherMetaData 1307 from the raw image file captured by the imaging unit 22 and recorded on the recording medium 200, links RecipeData 1306 and OtherMetaData 1307 with the image ID, and transmits the resultant from the communication unit 54 to the cloud storage 301. In step S815, at least ImageData 1309 that is the raw data, which is an image before raw development, in the raw image file is not transmitted. Redundant data transmission is thereby prevented.

In step S816, the system control unit 50 transmits an entire raw image file 1300 of the Nth image in the transmission reservation list from the communication unit 54 to the cloud storage 301 as information for issuing an instruction for the cloud development processing (development request). The raw image file 1300 to be transmitted is the one captured by the imaging unit 22 and recorded on the recording medium 200. In view of the consistency of the transmission processing sequence, RecipeData 1306 and OtherMetaData 1307 may be extracted from the raw image file 1300 as in step S815, and transmitted along with the entire raw image file 1300 at the same time.

In step S817, the system control unit 50 determines whether a normal response notification is obtained from the server within a predetermined time (for example, 200 msec or so) from the completion of the transmission in step S815 or S816. The normal response notification refers to a notification that the development request is received or a notification that the development request is rejected. In a case where such a normal response notification is obtained within a predetermined time (YES in step S817), the processing proceeds to step S818. In a case where a normal response notification is not obtained within the predetermined time (NO in step S817), the processing proceeds to step S824. Examples of the case where a normal response notification is not obtained include the following cases: The predetermined time elapses from the completion of the transmission in step S815 or S816 without a response from the server. A response is transmitted from the server before the lapse of the predetermined time from the completion of the transmission in step S815 or S816, but the response is not of a normal response notification. Examples of an abnormal notification include reception of a notification that the digital camera 100 is linked (paired) with a server which is not supposed to be normally received at this timing, and reception of noise with unknown notification content. Instead of the determination criterion of within a predetermined time, whether a normal response notification is received may be determined based on a determination criteria of within a predetermined number of periods of, for example, ten periods) in a case where a communication confirmation signal is transmitted and received to/from the server at a predetermined period of, for example, at a 20-msec period. In other words, the determination of step S817 concerns whether a condition indicating a stable communication is satisfied.

Conversely, the determination of step S817 is determination of whether a condition indicating a lack of stable communication between the communication unit 54 and the server is satisfied. In other words, the determination of step S817 can be determination of whether a condition that no normal response notification is received from the server within the predetermined time from the completion of the transmission in step S815 or S816 is satisfied. In step S817, in a case where the condition that no normal response notification is received from the server within the predetermined time from the completion of the transmission in step S815 or S816 is satisfied, the processing proceeds to step S824. In a case where the condition that no normal response notification is received from the server within the predetermined time is not satisfied, the processing proceeds to step S818.

In step S818, the system control unit 50 determines whether the notification received in step S817 is of receipt of a development request. In a case where the notification is of receipt of a development request (YES in step S818), the processing proceeds to step S819. In a case where the notification is of a failure of receipt of a development request (NO in step S818), the processing proceeds to step S813.

Even in a case where the notification of a failure of receipt of a development request is received as a normal response within the predetermined time, the digital camera 100 is unable to determine why the development request is in failure.

Thus, in step S813, the system control unit 50 inquires again whether the number of developable images is greater than 0. In a case where the number of developable images is 0 (NO in step S813), the processing proceeds to step S822 to abort transmission. In a case where the number of developable image is not 0 (YES in step S813), the processing proceeds to step S814 and the system control unit 50 attempts to transmit the same image again.

In step S819, the system control unit 50 perform processing for deleting the image ID of the Nth image in the transmission reservation list and the development parameter information and other additional information in the raw image file. Specifically, the system control unit 50 initializes RecipeData 1306 and OtherMetaData 1307 in the raw image file.

In step S820, the system control unit 50 determines whether there is an image yet to be transmitted in the transmission reservation list. Specifically, the system control unit 50 determines whether the total number of images Nmax in the transmission reservation list, which is the same as the number of images displayed in the specified image number display field 921, satisfies a relationship of N<Nmax. In a case where there is an image yet to be transmitted, i.e., the relationship of N<Nmax is satisfied, (YES in step S820), the processing proceeds to step S821. In a case where there is no image to be transmitted, i.e., the relationship of N<Nmax is not satisfied, which is a state where all the images registered in the transmission reservation list have been transmitted (NO in step S820), the processing proceeds to step S823. In such a case, the system control unit 50 may display a message indicating completion of transmission on the display unit 28 before the transmission processing ends. In step S829 to be described below, the number of developable images minus the number of transmitted images is displayed in the developable image number display field 922 displayed on the cloud development menu.

In step S821, the system control unit 50 increments the number of transmitted images N. The processing proceeds to step S813, and the system control unit 50 performs processing related to transmission of the next image.

In step S822, the system control unit 50 displays a message on the display unit 28 that the image transmission is aborted because the number of developable images is exceeded by the next image transmission. In a case where this message is displayed at N=1, the cloud development processing by the development server 303 is started by another device linked with the same user ID at almost the same timing as the operation to determine the transmission.

In a case where this message is displayed at N=2 or more, the cloud development processing by the development server 303 is started by another device linked with the same user ID at any timing between the operation to determine the transmission and the completion of the transmission.

In step S823, the system control unit 50 performs processing for disconnecting from the server. Once the connection is disconnected, the digital camera 100 enters the "offline state".

In step S824, the system control unit 50 obtains the image file of the Nth image in the transmission reservation list from the recording medium 200.

Figure 12C:
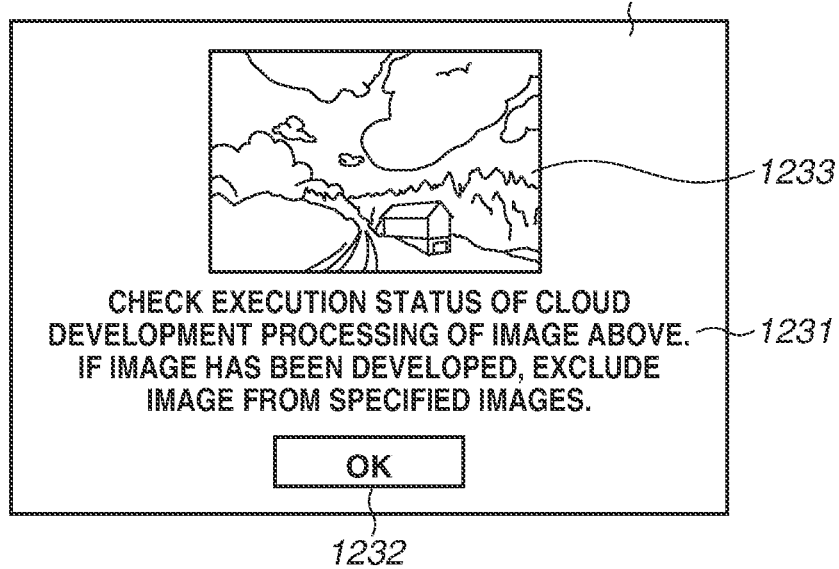
FIG. 12C is a diagram illustrating a display example of a communication error notification message.

In step S825, the system control unit 50 displays a notification message about a communication error on the display unit 28. FIG. 12C illustrates a display example of the notification message here. A notification screen 1230 displays a message 1231, an image 1233, and an OK button 1232. The message 1231 includes a description for prompting the user to check an execution status of the cloud development processing by the development server 303. In the present exemplary embodiment, the description corresponds to the text "CHECK EXECUTION STATUS OF CLOUD DEVELOPMENT PROCESSING OF IMAGE ABOVE" in FIG. 12C. The message 1231 also includes a description for prompting the user to remove specification of the image from the transmission reservation list in a case where the cloud development processing by the development server 303 is confirmed to have been executed on the image. In the present exemplary embodiment, the description corresponds to the text "IF IMAGE HAS BEEN DEVELOPED, EXCLUDE IMAGE FROM SPECIFIED IMAGES" in FIG. 12C. The OK button 1232 is an operation icon for the user having understood the notification description to perform a confirmation and issue an instruction to proceed to the next screen. The image 1233 is a thumbnail of a display image based on DisplayImageData 1308 of an image file of the Nth image obtained in step S824.

In step S826, the system control unit 50 determines whether an operation to press the OK button 1232, which is an operation for selection and determination, is performed. In a case where the operation to press the OK button 1232 is performed (YES in step S826), the processing proceeds to step S827. In a case where the operation to press the OK button 1232 is not performed (NO in step S826), the processing returns to step S826, and the notification message continues to be displayed.

In step S827, the system control unit 50 sets the image number unknown flag stored in the system memory 52 to 1. The image number unknown flag=1 indicates a state where the correct number of developable images managed by the server may not have been obtained because a normal response is not obtained from the server.

In step S828, the system control unit 50 determines whether the image number unknown flag is 1. In a case where the image number unknown flag is 1 (YES in step S828), the processing proceeds to step S830. In a case where the image number unknown flag is 0 (NO in step S828), the processing proceeds to step S829.

In step S829, the system control unit 50 displays the cloud development menu described with reference to FIG. 9C. The specified image number display field 921 and the developable image number display field 922 are updated and displayed based on the situation immediately before the disconnection in step S823. In other words, in a case where the image(s) is/are transmitted to the server, the developable image number display field 922 displays the numerical value of the number of images obtained by subtracting the number of images transmitted to the server based on the processing instruction from the latest number of developable images which is obtained before the transmission from the server and stored in the system memory 52. The transmission processing ends.

In step S830, the system control unit 50 displays the cloud development menu described with reference to FIG. 9B. The developable image number display field 922 displays the symbol "?". Such a non-numerical display can prompt the user to recognize that a correct numerical value may not have been obtained as the number of developable images.

By the transmission processing described above, the symbol "?" different from a numerical value indicating the number of developable images is displayed in step S830 based on the fact that the condition indicating a lack of stable communication with the server is satisfied after image transmission to the server. This display "?" (question mark) indicates a possibility of inconsistency with the correct number of developable images managed by the server, and will hereinafter be referred to as an inconsistency notification. The inconsistency notification can avoid the user's misunderstanding caused by display of an erroneous numerical value when there can be a discrepancy in the number of developable images between the server and the digital camera 100.

The display form of the inconsistency notification is not limited to "?" described above. Other display forms may be employed for the inconsistency notification in the developable image number display field 922 as long as the display is different from the numerical value indicating the remaining number of developable images displayed, which is "50" displayed in the developable image number display field 922 in FIG. 9C, in the case where the image number unknown flag is not set. For example, as illustrated in the developable image number display field 922 in FIG. 9E, a numerical value different from that displayed in the case where the image number unknown flag is not set in at least any one of color, pattern, thickness, font type, and background color may be displayed as the inconsistency notification.

Figure 9F:
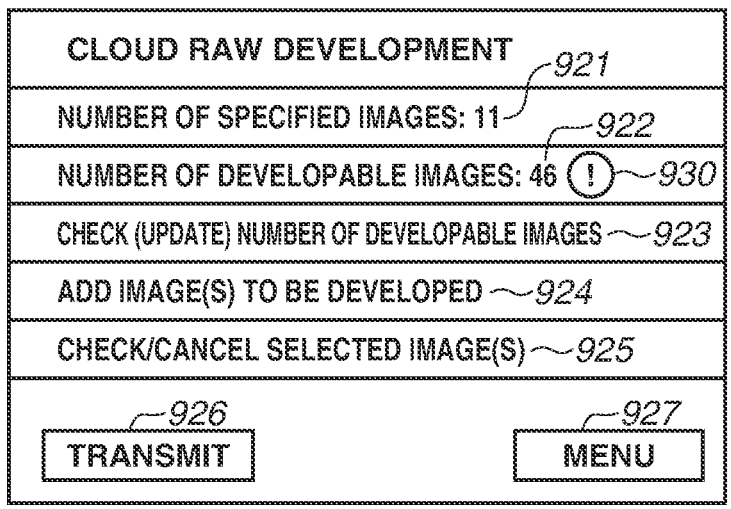

As illustrated in the developable image number display field 922 in FIG. 9F, a display item 930 serving as an inconsistency notification may be displayed in addition to the numerical display. Moreover, the numerical value that is usually constantly displayed may be blinked as an inconsistency notification. In other words, the numerical value may be displayed in a different blinking state from usual.

The inconsistency notification may be displayed in such a manner that association with the developable image number display field 922 is recognizable, instead of being displayed within an area of the developable image number display field 922. For example, the inconsistency notification may be displayed in a second display area different from the developable image number display field 922 along with a balloon, an arrow, or text designating the developable image number display field 922.

In a case of performing the determination in the foregoing step S817, the system control unit 50 may determine whether a condition different from the foregoing is satisfied as the condition indicating a lack of stable communication with the server, which is at least one of the cloud storage 301, the user setting management unit 304, and the development server 303.

For example, the system control unit 50 may determine whether any one of the following conditions is satisfied:

A cable is detected to come off in a situation where a communication apparatus capable of communicating with the server and the digital camera 100 are connected by the cable and the server and the digital camera 100 are communicating with each other via the cable;

The reception field intensity (unit: dBm) of the communication unit 54 falls below a predetermined value (for example, −80 dBm) for a predetermined time. In other words, the field intensity has dropped;

No response to a beacon (communication confirmation signal) regularly transmitted from the communication unit 54 to a relay apparatus, such as an access point (AP), a router, and a proxy server interposed in the communication with the server, is obtained for a predetermined time;

A notification, such as "the destination host is not reachable", "the destination host is unknown", and "disconnected" is received from the relay apparatus in response to a beacon (communication confirmation signal) regularly transmitted from the communication unit 54 to the relay apparatus. In other words, a notification of unavailability of communication with the server is received from the relay apparatus;

A notification that "the server is busy" is received from the server;

A disconnection notification is received from the server;

The system control unit 50 gets no response from the communication unit 54 for a certain time; and The communication unit 54 is out of order.

In a case where any of the foregoing conditions is true, i.e., stable communication is no longer being performed, the processing proceeds to step S823. In a case where all the foregoing conditions are false, i.e., no event indicating absence of stable communication has occurred, the processing proceeds to step S818.

In a case where any of the foregoing conditions indicating the absence of stable communication with the server is satisfied, the digital camera 100 is unable to determine whether the development processing responding to the processing instruction transmitted in step S815 or S816 immediately before (the immediately previous instruction) is executed by the server. The system control unit 50 is therefore unable to determine which state is correct between a state where the remaining number of images is the number obtained by subtracting the number of images developed in response to the immediate previous instruction from the number of developable images stored in the system memory 52 or a state where the number of developable images is the number of developable images stored in the system memory 52 which is the number not subtracted. Moreover, the number of developable images may have further decreased due to a development processing instruction issued from a different terminal apparatus associated with the same user account in a period when the communication with the server is unstable. In such a situation where it is unknown whether the remaining number of images is properly managed, the foregoing inconsistency notification is displayed to reduce a possibility of the user's misunderstanding about the remaining number of images available for the processing. In a case where the communication with the server is stabilized and the notification of the remaining number of developable images is successfully obtained from the server again after the inconsistency notification, the system control unit 50 ends displaying the inconsistency notification and displays, as illustrated in FIG. 9C, the remaining number of developable images in the developable image number display field 922 as usual.

In the foregoing example, the server, which is at least one of the cloud storage 301, the user setting management unit 304, and the development server 303, is described to be instructed to perform raw image development processing. However, this is not restrictive. In situations where the number of times of processing by a content processing server is limited, an electronic apparatus that can transmit a processing instruction for contents other than images can exercise control similar to that in the foregoing exemplary embodiment. For example, a description will be provided with a case where a content processing server can process audio data in response to each instruction issued from a plurality of apparatuses linked with the same account. Further, the number of instructions for the processing on audio data (audio processing) in the same account is limited up to 30 per month. In this case, in a case where a condition indicating absence of stable communication with the content processing server is satisfied, the electronic apparatus capable of issuing an instruction for the audio processing displays an inconsistency notification related to a display area for displaying the number of instructions. In this configuration, the user's misunderstanding caused by the display of an erroneous numerical value can be avoided in a case where there can be a discrepancy in the possible number of times of processing between the content processing server and the electronic device transmitting processing instructions. Similarly, inconsistency notifications can also be displayed about processing on various types of contents, including documents, charts, and files.

FIG. 13 illustrates a structure of a raw image file (still image data) recorded on the recording medium 200. Next, the structure of a raw image file will be described in detail.

A file format of a raw image file is an International Organization for Standardization (ISO) base media file format defined in ISO/International Electrotechnical Commission (IEC) 14496-12. This file format has a tree structure and includes nodes called boxes. Each box can include a plurality of boxes as child elements.

A raw image file 1300 includes a box ftyp 1301 for describing a file type at the beginning, and a box moov 1302 that contains all metadata and a box mdat 1303 that is a media data main body of a track. The box moov 1302 includes a box uuid 1304 including MetaData as its child element. MetaData describes metadata on the image.

Examples of the information included in MetaData are as follows:
  generation date and time information about the image;
  RecParameter 1305 that is setting information during imaging;
  RecipeData 1306 that is information (development parameter group) to be used by the development server 303 in performing the cloud development processing; and
  OtherMetaData 1307 that is other imaging information.

For example, the OtherMetaData 1307 may include detection information about human faces, eyes, and noses to be used by the development server 303 in performing the cloud development processing including relighting correction processing. The detection information can basically be obtained during imaging, but can also be detected in performing development processing for a preview in the foregoing steps S615 and S620. In a case where detection information is detected in performing the development processing for a preview, the detection information is stored into the OtherMetaData 1307 during the preview. The box mdat 1303 includes, as its child elements, the ImageData 1309 that is the raw data itself on the captured still image and the DisplayImageData 1308 that is a display image.

The DisplayImageData 1308, which is a display image, is smaller than ImageData 1309 in size. DisplayImageData 1308 is recorded in a Multi-Picture Format (MPF), and includes a medium-sized image and a DCF thumbnail image that is smaller than the medium-sized image and used in a list view. The file format described in the present exemplary embodiment is an example, and other boxes may be included as appropriate.

The system configuration and the development processing procedures for providing the cloud development processing service according to the present exemplary embodiment have been described above.

Next, supplementary descriptions about the characteristic configurations and processes of the system will be given. The characteristic configurations and processes are basically independent of each other, and even in a case where the characteristic configurations are individually provided, respective effects can be obtained.

In the foregoing exemplary embodiment, the digital camera 100 does not receive the developed images processed by the cloud development processing in the development server 303, and the result of the cloud development processing is unable to be checked using the digital camera 100. The reason for such a configuration is that if the developed images processed by the cloud development processing is received by the digital camera 100 and the processing result is checked using the digital camera 100, there are the following disadvantages. A certain time period is consumed until when the image processing result is checked using the digital camera 100 as much as the time for the development server 303 to apply the image processing and the time for the digital camera 100 to receive the processed images from the cloud storage 301. If the user is unaware of the time to be consumed before checking, the user waits for a long time in vain and new imaging opportunities can be missed during the waiting time. If communication is disconnected in the middle, it can take longer time before the image processing result can be checked, or the image processing result can even become unavailable for checking. In the foregoing exemplary embodiment, the digital camera 100 that is the sender of the images issues an image processing instruction to the server, and the result of the image processing is checked by accessing the server using a device different from the image sender. This can reduce the wait time of the image sender and reduce the risk of communication disconnection. Moreover, displaying the message 1211b prevents the user of the image sender from getting confused about how to check the image processing result, and the user can check the image processing result without confusion.

As a modification, the digital camera 100 may receive the developed images processed by the cloud development processing by the development server 303 so that the result of the cloud development processing can be checked using the digital camera 100. In this case, the developed images are received by the communication unit 54. However, in this case, it takes a certain time period before the image processing result is checked using the digital camera 100 because of the foregoing reasons. The system control unit 50 may therefore be configured to display a guidance for prompting the user to check the image processing result on the display unit 28 some time later after the image transmission, instead of or with the message 1211b. This configuration provides an advantage that the user is prevented from getting worried, since the user is noticed that the processing result can be checked using the digital camera 100 even in a case where the processing result is returned to the sender with a delay because of the communication conditions, for example. The display of the guidance can also prevent the user from being unaware that it takes long time before the processing result can be checked using the digital camera 100, and waiting in vain to miss imaging opportunities or cause a delay in other operations.

The camera 100 saves power consumption in communication processing by adaptively disconnecting from the development server 303 based on the processing content.

Referring to FIG. 5A, the camera 100 establishes a communication connection with the development server 303, obtains the service subscribing state, and then once disconnects the communication as illustrated in steps S507 and S510. The camera 100 then enters the "offline state" while the cloud development menu is displayed.

The reason of this configuration is that the communication connection with the server does not need to be maintained during the processing for adding images to be developed in step S512 before the execution of the processing for transmitting the image(s) to the development server 303 in step S516 and the subsequent steps. This can prevent the battery from being wasted by useless communication.

In displaying the cloud development menu in steps S508 and S511, the date and time of acquisition of the displayed information may also be displayed. This enables the user to identify whether the displayed information is the latest.

The camera 100 further performs control to reduce useless communication even after the transmission processing for transmitting the image(s) to the server is started.

Referring to FIG. 8B, in step S813, the camera 100 updates the number of developable images managed by the camera 100 before transmitting each image. The camera 100 then determines whether the image can be transmitted based on the number of developable images updated. In other words, in a case where the number of developable images before transmission is 0, the camera 100 aborts the transmission. This can prevent an error to transmit an undevelopable image. The battery exhaustion due to useless image transmission can thus be avoided.

The camera 100 inquires of the development server 303 about the number of developable images in the determination processing of step S813. Instead, the camera 100 may employ the following method.

In a case where a plurality of images is selected as development targets, the camera 100 transmits the images one by one in succession (step S816). Each time the transmission of an image is completed, the camera 100 may receive a notification of completion of the transmission and the number of developable images updated by the transmission. The number of developable images can thus be efficiently obtained by using a communication of the completion notification of the image transmission.

In step S814, whether the Nth image in the transmission reservation list has been transmitted is determined in every transmission of one image. However, the system control unit 50 may perform such determination for all the images in the transmission reservation list in a collective manner before starting the processing for transmitting the images in succession. This can further simplify the processing.

In the processing of steps S815 and S816, the system control unit 50 may store a transmission history for subsequent use based on transmission of the raw image file or the development parameter information. Specifically, based on the transmission history, the system control unit 50 may provide an already-transmitted image with an icons to indicate an already-transmitted status on an information display in browsing images using the camera 100. This can prevent a situation where development requests for the same image are repeatedly issued, to reduce the number of developable images in vain.

The foregoing various controls described to be performed by the system control unit 50 may be performed by a single piece of hardware. A plurality of pieces of hardware, for example, a plurality of processors or circuits, may perform processing in a distributed manner to control the entire apparatus.

While the exemplary embodiment of the present disclosure has been described in detail, the present disclosure is not limited to the specific exemplary embodiment, and various other exemplary embodiments not departing from the gist of the present disclosure are also covered by the present disclosure. Moreover, such exemplary embodiments are just some examples of embodiments of the present disclosure, and the exemplary embodiments can be combined as appropriate.

The foregoing exemplary embodiment has been described by using a case where the exemplary embodiment is applied to the digital camera 100 as an example. However, such an example is not restrictive. Specifically, the exemplary embodiment is applicable to a device or electronic apparatus that can communicate with the apparatuses on the network such as the cloud storage 301, the development server 303, and the user setting management unit 304. More specifically, the present exemplary embodiment can be applied to a PC, a personal digital assistant (PDA), a mobile phone terminal, a portable image viewer, a printer apparatus including a display, a digital photo frame, a music player, a game machine, and an electronic book reader.

The present exemplary embodiment is not limited to an imaging apparatus main body and also applicable to a control apparatus that communicates with an imaging apparatus (including a network camera) via wired or wireless communication and remotely controls the imaging apparatus. Examples of the apparatus for remotely controlling an imaging apparatus include apparatuses such as a smartphone, a tablet PC, and a desktop PC. The control apparatus can remotely control the imaging apparatus by notifying the imaging apparatus of commands to perform various operations and perform settings based on operations performed on the control apparatus and processing performed by the control apparatus. An LV image captured by the imaging apparatus can be received via wired or wireless communication and displayed on the control apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-218853, filed Dec. 28, 2020, which is hereby incorporated by reference herein in its entirety.

What is claimed is:

1. An electronic apparatus configured to communicate with a content processing system, the electronic apparatus comprising:
 a communication controller configured to control transmission of a processing instruction for content to the content processing system and control acquisition of a remaining content amount available for the processing from the content processing system via a communication unit; and
 a display controller configured to control display of a numerical value indicating the acquired remaining content amount in a specific display area, and in a case where a predetermined condition about communication is satisfied, control performing of a specific display in the specific display area based on satisfaction of the predetermined condition, wherein the specific display is different from the numerical value indicating the remaining content amount, wherein the specific display area is for display of the numerical value indicating the acquired remaining content amount, and
 wherein the communication controller and the display controller are implemented by one or more processors.

2. The electronic apparatus according to claim 1, wherein the display controller is configured to control, in a case where information about whether processing in response to the processing instruction is performed is not received after the transmission of the processing instruction to the content processing system, the performing of the specific display.

3. The electronic apparatus according to claim 2, wherein the display controller is configured to control, in a case where information about the remaining content amount is acquired from the content processing system via the communication unit after the performing of the specific display, the display of the numerical value indicating the acquired remaining content amount on the specific display area without performing the specific display.

4. The electronic apparatus according to claim 1, wherein in a case where the predetermined condition indicating a lack of stable communication between the communication unit and the content processing system is satisfied, the display controller is configured to control performing of the specific display in the specific display area.

5. The electronic apparatus according to claim 1, wherein in a case where the predetermined condition about communication is satisfied, the display controller is configured to control performing of a specific display in the specific display area based on satisfaction of the predetermined condition, and
 wherein the predetermined condition includes at least either one of the following states:
 that there is no response to the processing instruction transmitted via the communication unit for a predetermined period; and
 that a response to the processing instruction transmitted via the communication unit is not a normal response.

6. The electronic apparatus according to claim 1, wherein in a case where the predetermined condition about communication is satisfied, the display controller is configured to control performing of a specific display in the specific display area based on satisfaction of the predetermined condition, and
 wherein the predetermined condition is at least one of the following states:
 that a cable is detected to come off in a situation where a communication apparatus configured to communicate with the content processing system and the electronic apparatus are connected by the cable and the content processing system and the electronic apparatus are communicating with each other via the cable;
 that a reception field intensity of the communication unit has dropped;
 that no response to a communication confirmation signal transmitted from the communication unit to a relay apparatus interposed in communication with the content processing system is obtained for a predetermined period;
 that a notification of unavailability of the communication with the content processing system is received from the relay apparatus;
 that a notification that the content processing system is busy is received;
 that a disconnection notification is received from the content processing system; and
 that the communication unit is out of order.

7. The electronic apparatus according to claim 1, wherein the specific display is display of a specific symbol in the specific display area, the symbol being different from a numerical value.

8. The electronic apparatus according to claim 7, wherein the display controller is configured to control the display of the specific symbol as the specific display without displaying a numerical value indicating the remaining content amount in the specific display area.

9. The electronic apparatus according to claim 1, wherein the specific display is at least either one of the following forms:
 a display different from the numerical value displayed in the specific display area in a case where the predetermined condition is not satisfied in at least one of color, pattern, thickness, font type, and a blinking state; and
 display of a specific display item different from the numerical value related to the specific display area.

10. The electronic apparatus according to claim 1, wherein the display controller is further configured to control, in a case where the predetermined condition is satisfied, display of a guidance for prompting a user to check an execution status of processing performed by the content processing system.

11. The electronic apparatus according to claim 1,
 wherein processing by the content processing system in response to the processing instruction is used in an account of a user subscribed to a content processing service provided by the content processing system or an account of a user paid for use of the content processing service, and
 wherein the remaining content amount available for the processing is defined account by account.

12. The electronic apparatus according to claim 1,
 wherein the content processing system is configured to communicate with a plurality of apparatuses, and
 wherein the remaining content amount available for the processing also decreases in a case where the content processing system processes content in response to a processing instruction issued from an apparatus other than the electronic apparatus.

13. The electronic apparatus according to claim 12, further comprising:
an image sensor,
wherein the content is an image captured by the image sensor.

14. The electronic apparatus according to claim 1,
wherein the content is an image, and
wherein the processing instruction is an image processing instruction including a plurality of image processing parameters.

15. The electronic apparatus according to claim 14,
wherein the content is a raw image, and
wherein the processing instruction is an instruction for development processing of the raw image.

16. The electronic apparatus according to claim 1, wherein the content processing system includes a server on a network, the server being configured to store the content.

17. A method for controlling an electronic apparatus configured to communicate with a content processing system, the method comprising:
controlling transmission of a processing instruction for content to the content processing system and controlling acquisition of a remaining content amount available for the processing from the content processing system via a communication unit; and
controlling display of a numerical value indicating the acquired remaining content amount in a specific display area, and in a case where a predetermined condition about communication is satisfied, controlling performing of a specific display in the specific display area based on satisfaction of the predetermined condition, wherein the specific display is different from the numerical value indicating the remaining content amount, and wherein the specific display area is for display of the numerical value indicating the acquired remaining content amount.

18. A non-transitory computer-readable storage medium storing a program for causing a computer to perform a method for controlling an electronic apparatus configured to communicate with a content processing system, the method comprising:
controlling transmission of a processing instruction for content to the content processing system and controlling acquisition of a remaining content amount available for the processing from the content processing system via a communication unit; and
controlling display of a numerical value indicating the acquired remaining content amount in a specific display area, and in a case where a predetermined condition about communication is satisfied, controlling performing of a specific display in the specific display area based on satisfaction of the predetermined condition, wherein the specific display is different from the numerical value indicating the remaining content amount, and wherein the specific display area is for display of the numerical value indicating the acquired remaining content amount.

* * * * *